United States Patent
Ogawa et al.

(10) Patent No.: US 10,878,545 B2
(45) Date of Patent: Dec. 29, 2020

(54) INFORMATION PROCESSING DEVICE, IMAGING APPARATUS, IMAGE REPRODUCTION APPARATUS, AND METHOD AND PROGRAM

(71) Applicant: SONY CORPORATION, Tokyo (JP)

(72) Inventors: Kouji Ogawa, Tokyo (JP); Mitsuru Katsumata, Tokyo (JP); Hirofumi Shimada, Kanagawa (JP); Yuta Murata, Kanagawa (JP); Takehiko Nakano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 8 days.

(21) Appl. No.: 16/078,745

(22) PCT Filed: Jan. 16, 2017

(86) PCT No.: PCT/JP2017/001197
§ 371 (c)(1),
(2) Date: Aug. 22, 2018

(87) PCT Pub. No.: WO2017/168949
PCT Pub. Date: Oct. 5, 2017

(65) Prior Publication Data
US 2019/0057496 A1 Feb. 21, 2019

(30) Foreign Application Priority Data

Mar. 29, 2016 (JP) ................. 2016-066188

(51) Int. Cl.
*G06T 3/40* (2006.01)
*G06T 5/50* (2006.01)
(Continued)

(52) U.S. Cl.
CPC .............. *G06T 5/50* (2013.01); *G06T 3/4038* (2013.01); *G06T 7/11* (2017.01); *G06T 7/70* (2017.01);
(Continued)

(58) Field of Classification Search
CPC ........... H04N 5/23203; H04N 5/23238; H04N 5/268; H04N 5/23222; H04N 5/247;
(Continued)

(56) References Cited

U.S. PATENT DOCUMENTS

| 8,805,091 B1 | 8/2014 | Hensel et al. |
| 2006/0028558 A1 | 2/2006 | Sato et al. |

(Continued)

FOREIGN PATENT DOCUMENTS

| CN | 1748410 A | 3/2006 |
| CN | 100414974 C | 8/2008 |

(Continued)

OTHER PUBLICATIONS

Mar. 18, 2019, European Search Report issued for related EP Application No. 17773499.3.

(Continued)

*Primary Examiner* — Phuoc H Doan
(74) *Attorney, Agent, or Firm* — Paratus Law Group, PLLC

(57) ABSTRACT

Captured images acquired by a plurality of imaging units are output to a captured image combining unit, which generates a composite image by joining the captured images in accordance with composite setting information generated by a composite setting information generation unit. A specific region information generation unit generates specific region information indicating the specific region corresponding to a specific imaging region in the composite image. In accordance with the specific region information, the captured image combining unit can easily perform an invalidation or emphasizing process, for example, on the image corresponding to the specific imaging region. The specific region information is also associated with the composite image generated by the captured image combining unit, so that reproduction control on the specific region corresponding to the specific imaging region in the composite image can be performed at the time of reproduction or the like of the composite image.

20 Claims, 16 Drawing Sheets

(51) Int. Cl.
*H04N 1/387* (2006.01)
*H04N 5/232* (2006.01)
*G06T 7/11* (2017.01)
*G06T 7/70* (2017.01)

(52) U.S. Cl.
CPC ........... *H04N 1/387* (2013.01); *H04N 1/3876* (2013.01); *H04N 5/23238* (2013.01); *G06T 2207/20221* (2013.01)

(58) Field of Classification Search
CPC . G06T 5/003; G06T 5/50; G06T 2207/20221; G06T 7/70; G06T 7/11
USPC ........................................ 382/255, 284, 294
See application file for complete search history.

(56) References Cited

U.S. PATENT DOCUMENTS

| | | | |
|---|---|---|---|
| 2006/0104541 A1* | 5/2006 | Baker | G06T 3/4038 382/284 |
| 2006/0120623 A1 | 6/2006 | Tsukamoto et al. | |
| 2010/0046803 A1 | 2/2010 | Tomita | |
| 2017/0039417 A1* | 2/2017 | Saruta | G06K 9/00362 |

FOREIGN PATENT DOCUMENTS

| | | |
|---|---|---|
| EP | 2252044 A2 | 11/2010 |
| EP | 2779621 A1 | 9/2014 |
| JP | 2000-215317 A | 8/2000 |
| JP | 2001-298652 A | 10/2001 |
| JP | 2005-333552 A | 12/2005 |
| JP | 2010-008620 A | 1/2010 |
| JP | 2014-039119 A | 2/2014 |
| JP | 2015-121850 A | 7/2015 |
| WO | WO 2004/105383 A1 | 12/2004 |
| WO | WO 2015/093553 A1 | 6/2015 |

OTHER PUBLICATIONS

Apr. 9, 2020, Chinese Office Action Issued for related CN application No. 201780019393.2.

* cited by examiner

FIG. 3
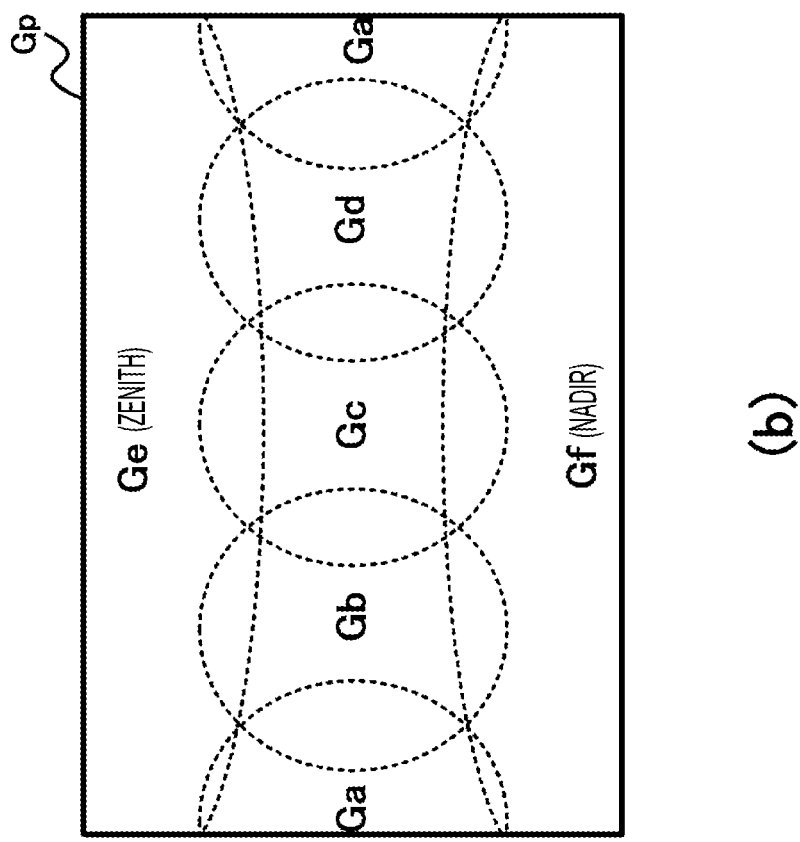
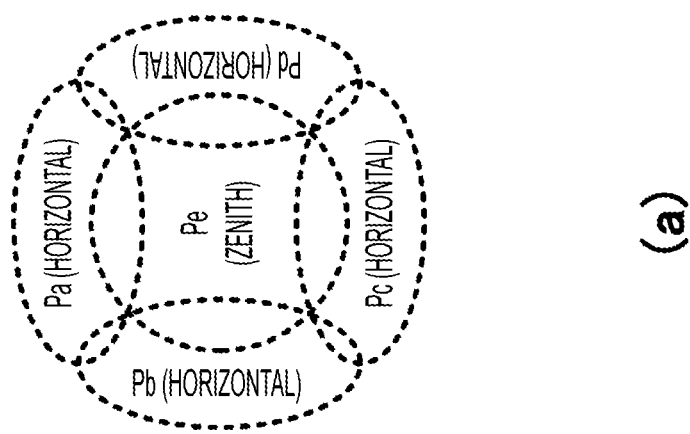

FIG. 4

| TIME CODE | LATITUDE | LONGITUDE | ALTITUDE (m) | AZIMUTH (DEGREE, ABBR.) (IMAGING DEVICE) | ELEVATION ANGLE (DEGREE) (IMAGING DEVICE) |
|---|---|---|---|---|---|
| 00:00:00:01 | N35,xxxxxx | E139,xxxxxx | 10 | 0, N | 90 |
| 00:00:00:02 | N35,xxxxxx | E139,xxxxxx | 10 | 0, N | 90 |
| 00:00:00:03 | N35,xxxxxx | E139,xxxxxx | 11 | 349, N | 80 |
| ... | ... | ... | ... | ... | ... |
| 00:00:10:00 | N35,xxxyyy | E139,xxxxzz | 8 | 320, NW | 90 |

FIG. 9

| TIME CODE | APPLICABLE RANGE INFORMATION ||| REGION SETTING INFORMATION ||
| | LATITUDE | LONGITUDE | ALTITUDE (m) | SPECIFIC REGION AR1 | SPECIFIC REGION AR2 |
| --- | --- | --- | --- | --- | --- |
| 00:00:00:00 | N35,yyyyyy~N40,yyyyyy | E139,yyyyyy~E140,yyyyyy | 0–50 | (0,0)(1920,0)(0,10)(1920,10) | (0,1080)(1920,1080)(0,1070)(1920,1070) |
| 00:10:00:00 | N35,yyyyyy~N40,yyyyyy | E139,yyyyyy~E140,yyyyyy | 0–50 | (0,0)(1920,0)(0,10)(1920,10) | (0,1080)(1920,1080)(0,1070)(1920,1070) |
| 00:00:00:03 | none | none | 0–50 | (100,100)(100,200)(200,100)(200,200) | none |
| 00:00:00:04 | none | none | none | none | none |
| ... | ... | ... | ... | ... | ... |
| ::: | none | none | none | none | (950,540)(1920,540)(960,1080)(1920,1080) |

FIG. 14

| TIME CODE | IMAGING UNIT 11-1 | IMAGING UNIT 11-2 | IMAGING UNIT 11-3 | IMAGING UNIT 11-4 | IMAGING UNIT 11-5 |
|---|---|---|---|---|---|
| 00:00:00:01 | PERSON A (x1,y1)(x1',y1') | PERSON B (x2,y2)(x2',y2') | BUILDING A (x5,y5)(x5',y5') | DOG A (x8,y8)(x8',y8') | |
| 00:00:00:02 | | PERSON A (x3,y3)(x3',y3') PERSON B (x2,y2)(x2',y2') | BUILDING A (x5,y5)(x5',y5') | | DOG A (x10,y10)(x10',y10') |
| 00:00:00:03 | | PERSON A (x4,y4)(x4',y4') | PERSON B (x6,y6)(x6',y6') BUILDING A (x5,y5)(x5',y5') | | DOG A (x10,y10)(x10',y10') |
| ... | | | PERSON A (x7,y7)(x7',y7') PERSON B (x6,y6)(x6',y6') BUILDING A (x5,y5)(x5',y5') | | DOG A (x10,y10)(x10',y10') |
| 00:00:10:00 | | | PERSON B (x6,y6)(x6',y6') BUILDING A (x5,y5)(x5',y5') | PERSON A (x9,y9)(x9',y9') | DOG A (x10,y10)(x10',y10') |

FIG. 16

| TIME CODE | MICROPHONE A | MICROPHONE B | MICROPHONE C |
|---|---|---|---|
| 00:00:00:01 | A ON | | |
| 00:00:00:02 | GREAT WEATHER! | WHERE ARE YOU GOING? | |
| 00:00:00:03 | ... | ... | A OFF |
| ... | | | ... |
| 00:00:10:00 | ALL OFF | | | ized
INFORMATION PROCESSING DEVICE, IMAGING APPARATUS, IMAGE REPRODUCTION APPARATUS, AND METHOD AND PROGRAM

CROSS REFERENCE TO PRIOR APPLICATION

This application is a National Stage Patent Application of PCT International Patent Application No. PCT/JP2017/001197 (filed on Jan. 16, 2017) under 35 U.S.C. § 371, which claims priority to Japanese Patent Application No. 2016-066188 (filed on Mar. 29, 2016), which are all hereby incorporated by reference in their entirety.

TECHNICAL FIELD

This technology resides in an information processing device, an imaging apparatus, an image reproduction apparatus, a method, and a program, and is to enable processing of an image of a desired imaging region in a composite image obtained by joining captured images acquired by a plurality of imaging units.

BACKGROUND ART

In conventional operations, a wide-angle image is generated from a plurality of images having different imaging directions. For example, imaging is performed by orienting a plurality of imaging units in different directions, and the acquired captured images are joined by a technique disclosed in Patent Document 1. In this manner, a composite image in which the captured images are joined in a continuous manner without any image shifting is generated.

Further, according to Patent Document 2, a spherical image is captured with a plurality of imaging units having different imaging directions, and the images generated by the respective imaging units are joined. In this manner, a spherical image showing a sphere is generated.

CITATION LIST

Patent Documents

Patent Document 1: Japanese Patent Application Laid-Open No. 2000-215317
Patent Document 2: Japanese Patent Application Laid-Open No. 2001-298652

SUMMARY OF THE INVENTION

Problems to be Solved by the Invention

Meanwhile, in a case where a composite image such as a spherical image is generated, an image of an imaging region might be deleted or replaced. For example, in a case where a non-target object such as a photographer or a device being used at the time of imaging appears in a resultant image, it is necessary to delete or replace the image of the imaging region of the non-target object. Also, in a case where a specific region that is the current target region to be deleted or replaced in an image is determined in accordance with the image, for example, it is not easy to distinguish the specific region from the composite image, since the imaging range of the composite image is wide. Further, in a case where a specific region is distinguished from a composite image in accordance with an image, if the composite image is a moving image, the specific region needs to be distinguished in accordance with the image of each frame. As a result, a long time is required for processing an image of the specific region.

In view of the above, this technology aims to provide an information processing device, an imaging apparatus, an image reproduction apparatus, and a method and a program that are designed to enable easy processing of an image of a desired imaging region in a composite image obtained by joining captured images acquired by a plurality of imaging units.

Solutions to Problems

A first aspect of this technology resides in an information processing device that includes a specific region information generation unit that generates specific region information indicating a specific region corresponding to a specific imaging region in a composite image obtained by joining captured images acquired by a plurality of imaging units.

In this technique, specific region information indicating a specific region corresponding to a specific imaging region in a composite image obtained by joining captured images acquired by a plurality of imaging units is generated by a specific region information generation unit. Also, imaging information indicating the imaging position information, the imaging direction, the imaging range, and the time information about the imaging units is generated by an imaging information generation unit. The specific region information includes application range information, and indicates not only the specific region in the composite image but also the application time of the image processing on the specific region or the imaging position to which the image processing is applied. The specific imaging region is a region imaged by a specific imaging unit of the plurality of imaging units, an imaging region designated with an orientation and an elevation angle, or an imaging region designated with an apex angle and a corner angle, for example.

A composite setting information generation unit is also provided. The composite setting information generation unit generates composite setting information for joining the captured images acquired by the plurality of imaging units in a continuous manner without causing any image shifting. A captured image combining unit that generates a composite image generates a composite image based on a predetermined imaging direction, in accordance with the composite setting information generated by the composite setting information generation unit. An output unit that outputs the composite image associated with the specific region information is further provided.

The specific region information generation unit can also generate specific region information for each restriction level at a time of reproduction a composite image, specific region information setting a specific region that is the region of a composite image including an imaged predetermined object, specific region information based on text data generated from audio data, specific region information based on acquired command information, or specific region information based on imaging information and position information about an object.

A second aspect of this technology resides in an information processing method for generating information relating to a composite image obtained by joining captured images acquired by a plurality of imaging units.

The information processing method includes
generating specific region information with a specific region information generation unit, the specific region information indicating the specific region corresponding to a specific imaging region in the composite image.

A third aspect of this technology resides in a program for generating information with a computer, the information relating to a composite image obtained by joining captured images acquired by a plurality of imaging units.

The program causing the computer to achieve a function of generating specific region information indicating the specific region corresponding to a specific imaging region in the composite image.

A fourth aspect of this technology resides in an imaging apparatus that includes:

a plurality of imaging units;

a captured image combining unit that generates a composite image by joining captured images acquired by the plurality of imaging units; and a specific region information generation unit that generates specific region information indicating the specific region corresponding to a specific imaging region in the composite image.

In this technique, a composite image is generated by joining captured images that are acquired by a plurality of imaging units and have different imaging directions. Specific region information indicating the specific region corresponding to a specific imaging region in the composite image is also generated. Further, a captured image combining unit performs image processing on the specific region in the composite image, in accordance with the generated specific region information. Alternatively, the composite image and the specific region information are associated with each other, and are then output.

A fifth aspect of this technology resides in an image reproduction apparatus that includes:

an image reading unit that reads a composite image generated by joining a plurality of captured images;

an information reading unit that reads specific region information indicating the specific region corresponding to a specific imaging region in the composite image; and a reproduction control unit that performs reproduction control on the specific region indicated by the specific region information read by the information reading unit in the composite image read by the image reading unit.

In this technique, a composite image generated by joining a plurality of captured images, and specific region information indicating the specific region corresponding to a specific imaging region in the composite image are acquired. An invalidation process or an emphasizing process is also performed on the specific region indicated by the specific region information in the acquired composite image. In the invalidation process, a process of combining an image of the specific region with the texture indicated by the specific region information, or a process of stopping the output of an image of the specific region or replacing the image of the specific region with invalid data is performed, for example.

Effects of the Invention

According to this technique, specific region information indicating the specific region corresponding to a specific imaging region in a composite image obtained by joining captured images acquired by a plurality of imaging units is generated. Thus, it is possible to easily process the specific region corresponding to an image of a desired imaging region in the composite image, in accordance with the specific region information. It should be noted that the advantageous effects described in this specification are merely examples, and the advantageous effects of the present technology are not limited to them and may include additional effects.

BRIEF DESCRIPTION OF DRAWINGS

FIG. 3 is a diagram showing an example of the correspondence relationship between imaging regions and regions in a two-dimensional plane in a case where six imaging units are used.

FIG. 4 is a diagram showing an example of time series data of imaging information.

FIG. 9 is a diagram showing an example of specific region information.

FIG. 14 is a diagram showing an example of time series data of imaging information.

FIG. 16 is a diagram showing an example of the time series data of imaging information generated in accordance with audio data.

MODES FOR CARRYING OUT THE INVENTION

The following is a description of an embodiment for carrying out the present technology. It should be noted that explanation will be made in the following order.

1. Configuration and Operation of an Imaging Apparatus
1-1. Configuration of the Imaging Apparatus
1-2. Operation of the Imaging Apparatus
2. Configuration and Operation of an Image Reproduction Apparatus
2-1. First Configuration and Operation of the Image Reproduction Apparatus
2-2. Second Configuration and Operation of the Image Reproduction Apparatus
3. Modifications of Imaging Information and Specific Region Information <1. Configuration and Operation of an Imaging Apparatus>
<1-1. Configuration of the Imaging Apparatus>

Figure 1:
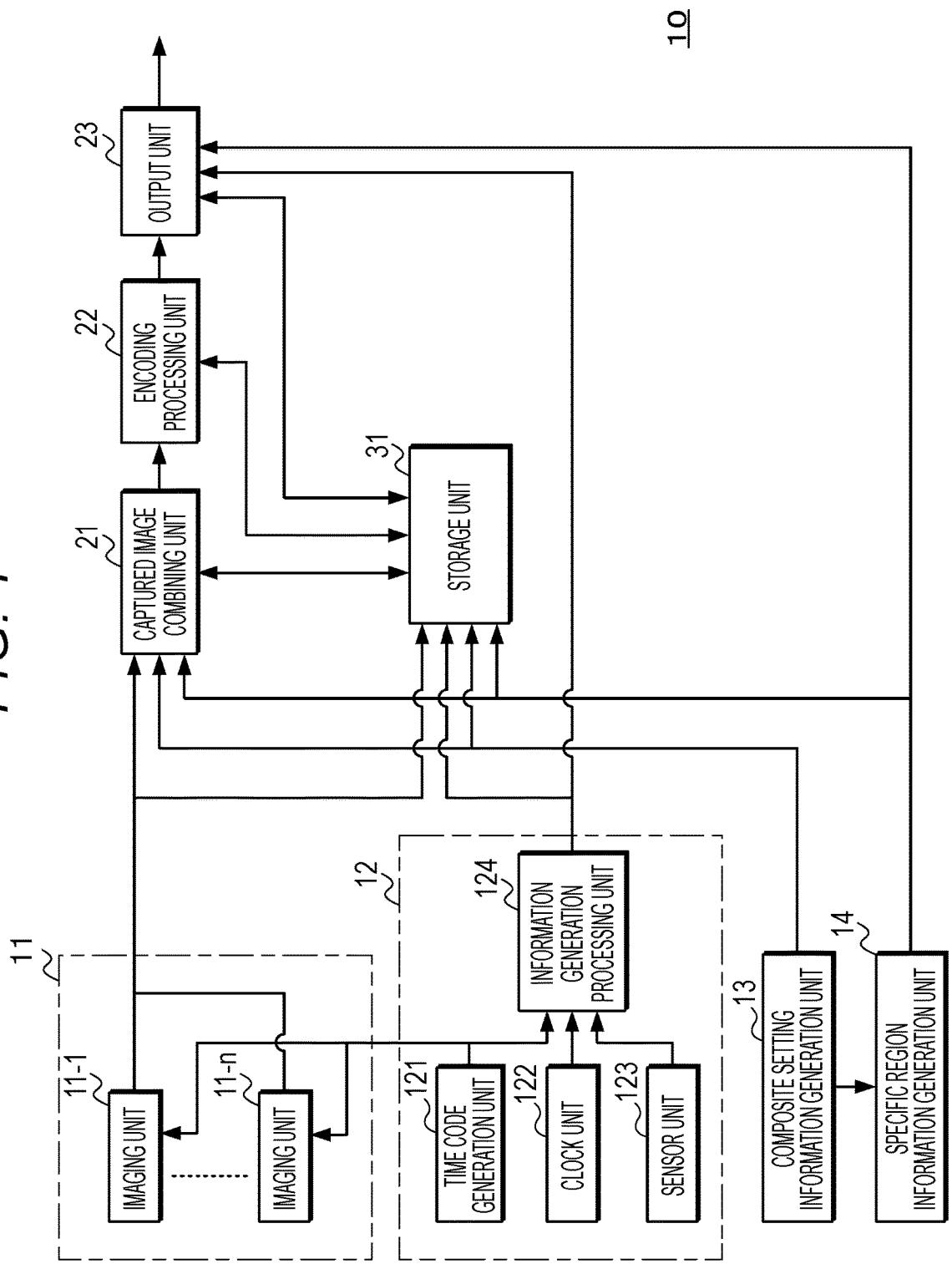
FIG. 1 is a diagram showing an example configuration of an imaging apparatus.

FIG. 1 shows an example configuration of an imaging apparatus using an information processing device of the present technology. The imaging apparatus 10 includes a captured image acquisition unit 11, an imaging information generation unit 12, a composite setting information generation unit 13, and a specific region information generation unit 14. The imaging apparatus 10 also includes a captured image combining unit 21, an encoding processing unit 22, and an output unit 23. In the imaging apparatus 10, a storage unit (a recording medium, for example) 31 may be further provided in a fixed or detachable manner. It should be noted that a case where the storage unit 31 is used will be described later.

The captured image acquisition unit 11 is formed with a plurality of imaging units 11-1 through 11-*n*. The imaging ranges of the imaging units 11-1 through 11-*n* and the physical layout of the imaging units 11-1 through 11-*n* are set so that a composite image formed with captured images continuously joined without any image shifting can be generated when the captured images acquired by the imaging units 11-1 through 11-*n* are combined. The captured image acquisition unit 11 incorporates a time code supplied from a time code generation unit 121 of the imaging information generation unit 12 into image data of the captured images acquired by the imaging units 11-1 through 11-*n*, and outputs the image data to the captured image combining unit 21. It should be noted that the composite image is an image having a wider angle of view than a captured image obtained with one imaging unit. For example, the composite image is a spherical image, an image (a hemispherical image, for example) in which the imaging range is narrower than that of a spherical image, an image in which the imaging range is widened in the horizontal direction and/or the vertical direction, or the like.

The imaging information generation unit 12 generates imaging information that includes an imaging position, an imaging direction, an imaging range, and time information. The imaging information generation unit 12 includes the time code generation unit 121, a clock unit 122, a sensor unit 123, and an information generation processing unit 124. The time code generation unit 121 generates a time code, and outputs the time code to the captured image acquisition unit 11 and the information generation processing unit 124. The clock unit 122 generates time information, and outputs the time information to the information generation processing unit 124. The sensor unit 123 is formed with a position sensor, an altitude sensor, an orientation sensor, an elevation sensor, and the like. The sensor unit 123 generates, for example, imaging position information indicating the latitude, the longitude, and the altitude of the imaging apparatus 10 (or the captured image acquisition unit 11 in a case where the captured image acquisition unit 11 can be separated from the main body of the imaging apparatus 10), and posture information indicating the orientation and the elevation angle of the imaging apparatus 10 (or the reference imaging unit among the imaging units of the captured image acquisition unit 11, for example). The sensor unit 123 outputs the imaging position information and the posture information to the information generation processing unit 124. As will be described later, the information generation processing unit 124 uses the time code and the time information, and the imaging position information and the posture information, to generate imaging information that is meta information relating to the captured images acquired by the captured image acquisition unit 11 or the later described composite image generated by the captured image combining unit 21. The imaging information includes common data and time series data. The common data is time-independent information, and is generated at the start of imaging or before the start of imaging, for example. The time series data is time-dependent information, and is generated with the use of the imaging position information and the posture information that may change with the passage of time, and the time code that is time information. The time series data is also periodically generated at predetermined time intervals. The imaging information generation unit 12 outputs the generated imaging information to the output unit 23.

The composite setting information generation unit 13 generates composite setting information for joining the captured images so as to be continuous without any image shifting in the image joining process (stitching process) to be performed by the captured image combining unit 21. For example, the composite setting information generation unit 13 generates the composite setting information as described later, in accordance with physical layout information about the imaging units 11-1 through 11-*n* used in the captured image acquisition unit 11, lens information indicating the focal length and the like of the lenses used in the imaging units 11-1 through 11-*n*, information about a projection method for projecting a wide-angle image like a spherical image on a two-dimensional plane, image size information about an image projected on a two-dimensional plane, and the like. The information to be used for generating the composite setting information may be input by the user, or may be automatically acquired by the composite setting information generation unit 13. For example, the composite setting information generation unit 13 may communicate with the imaging units 11-1 through 11-*n*, and automatically acquire the lens information to be used in generating the composite setting information. The composite setting information generation unit 13 outputs the composite setting information to the captured image combining unit 21 and the specific region information generation unit 14.

The specific region information generation unit 14 generates specific region information indicating a specific region corresponding to a specific imaging region in the composite image obtained by joining the captured images acquired by the imaging units 11-1 through 11-*n*. The specific imaging region is the imaging region of an object which is not a target, for example. The specific imaging region is a region to be imaged by one of the imaging units 11-1 through 11-*n*. The one imaging unit is designated by examining the identification information assigned beforehand to the respective imaging units 11-1 through 11-*n*. Alternatively, the specific imaging region may be an imaging region designated with apex angles and corner angles in a coordinate system based on the imaging position (this coordinate system will be hereinafter referred to as the "camera coordinate system"), or an imaging region designated with orientations and elevation angles in the real world.

The specific region information generation unit 14 also generates region setting information that is a group of coordinates indicating the specific region corresponding to the specific imaging region in a composite image. In a case where the specific imaging region is an imaging region to be imaged by an imaging unit designated with the identification information, or an imaging region designated with apex angles and corner angles in the camera coordinate system, the specific region information generation unit 14 transforms the imaging region into two-dimensional coordinates of the specific region in the composite image, using the composite setting information. Also, in a case where the specific imaging region is an imaging region designated with orientations and elevation angles in the real world, the specific region information generation unit 14 acquires the imaging information from the imaging information generation unit 12, and transforms the imaging region designated with the orientations and the elevation angles into an imaging region in the camera coordinate system, using the acquired imaging information. Further, the specific region information generation unit 14 transforms the transformed imaging region in the camera coordinate system into the two-dimensional coordinates of the specific region in the composite image, using the composite setting information.

The specific region information generation unit 14 also generates application range information indicating the application range of the image processing for the specific region indicated by the region setting information. The specific region information generation unit 14 outputs the specific region information including the region setting information and the application range information to the captured image combining unit 21 or the output unit 23. It should be noted that the specific region information is meta information relating to the captured images acquired by the captured image acquisition unit 11 or the later described composite image generated by the captured image combining unit 21.

In accordance with the image data of the captured images output from the captured image acquisition unit 11 and the composite setting information output from the composite setting information generation unit 13, the captured image combining unit 21 generates a composite image on a two-dimensional plane by joining the images acquired by the imaging units 11-1 through 11-$n$. The captured image combining unit 21 outputs the image data of the generated composite image to the encoding processing unit 22. Furthermore, in a case where image data subjected to image processing for the specific region of the composite image from the imaging apparatus 10, the captured image combining unit 21 performs specific region image processing on the generated composite image in accordance with the specific region information output from the specific region information generation unit 14. The captured image combining unit 21 outputs the image data of the composite image subjected to the specific region image processing to the encoding processing unit 22.

The encoding processing unit 22 performs an image encoding process, to generate encoded data with a compressed data amount. In a case where the composite image is a moving image, for example, the encoding processing unit 22 performs a process of generating encoded data compliant with standards such as H.265 (ISO/IEC 23008-2 HEW) and H.264/AVG. The encoding processing unit 22 outputs the generated encoded data to the output unit 23.

The output unit 23 outputs the encoded data of the composite image associated with the meta information. In a case where the encoded data of the composite image has not been subjected to image processing on the specific region, the output unit 23 generates multiplexed data by multiplexing the encoded data with the imaging information generated by the imaging information generation unit 12 or with the specific region information generated by the specific region information generation unit 14, for example. Furthermore, in a case where the encoded data of the composite image has been subjected to the image processing on the specific region, the output unit 23 may generate multiplexed data by multiplexing the imaging information generated by the imaging information generation unit 12 with the encoded data, for example. The output unit 23 outputs the generated multiplexed data and the encoded data of the composite image subjected to the image processing on the specific region, to an external device or the like via the transmission path.

Furthermore, in a case where the storage unit 31 is provided, the storage unit 31 may store the image data of the captured images acquired by the captured image acquisition unit 11, or may store the image data of the composite image generated by the captured image combining unit 21, the encoded data generated by the encoding processing unit 22, or the like. Further, the storage unit 31 may store the meta information such as the imaging information generated by the imaging information generation unit 12, the composite setting information generated by the composite setting information generation unit 13, and the specific region information generated by the specific region information generation unit 14. Here, the meta information is associated with the image data of the captured images or the composite image. It should be noted that the associating includes adding the meta information to the image data, recording the imaging information and the like into the same file as the image data, and recording the image data and the imaging information and the like on the same recording medium. The associating also includes, for example, multiplexing the image data with the imaging information and the like as described above. Further, the image data and the encoded data may be associated with the meta information or the like and are stored into the storage unit 31, so that the image data and the encoded data associated with the meta information or the like can be output via the storage unit 31.

In the storage unit 31, the stored image data of the captured images acquired by the captured image acquisition unit 11 is associated with the imaging information generated by the imaging information generation unit 12, the composite setting information generated by the composite setting information generation unit 13, and the specific region information generated by the specific region information generation unit 14, for example. In this case, even if the imaging apparatus 10 does not include the captured image combining unit 21 and the encoding processing unit 22, an external device can generate a composite image or perform image processing or the like on the specific region in the composite image, by reading the information associated with the image data from the storage unit 31. Accordingly, it is possible to efficiently perform image processing on the specific region in the composite image, by dividing processes between the imaging apparatus and the external device in accordance with the processing capabilities or the like of the imaging apparatus and the external device, for example.

Alternatively, in the imaging apparatus 10, the storage unit 31 may store the image data of the captured images acquired by the captured image acquisition unit 11, the composite setting information, and the like, so that the image data of the captured images and the composite setting information can be read from the storage unit 31 later, and a composite image can be generated by the captured image combining unit 21. In this case, even in a case where the captured image combining process requires a long time, priority can be put on the imaging operation.

Furthermore, in a case where images are stored into the storage unit 31, the composite image generated by the captured image combining unit 21 is stored, so that the amount of data to be stored can be made smaller than that in a case where the captured images acquired by the captured image acquisition unit 11 are stored into the storage unit 31. Further, the encoded data generated by the encoding processing unit 22 is stored into the storage unit 31, so that the data amount can be further reduced. It should be noted that, if a decoding processing unit and a display unit are provided in the imaging apparatus 10, it is possible to check the contents of the encoded data.

<1-2. Operation of the Imaging Apparatus>

Next, operation of the imaging apparatus is described. The imaging apparatus 10 performs an imaging process and a combining/specific region process.

Figure 2:
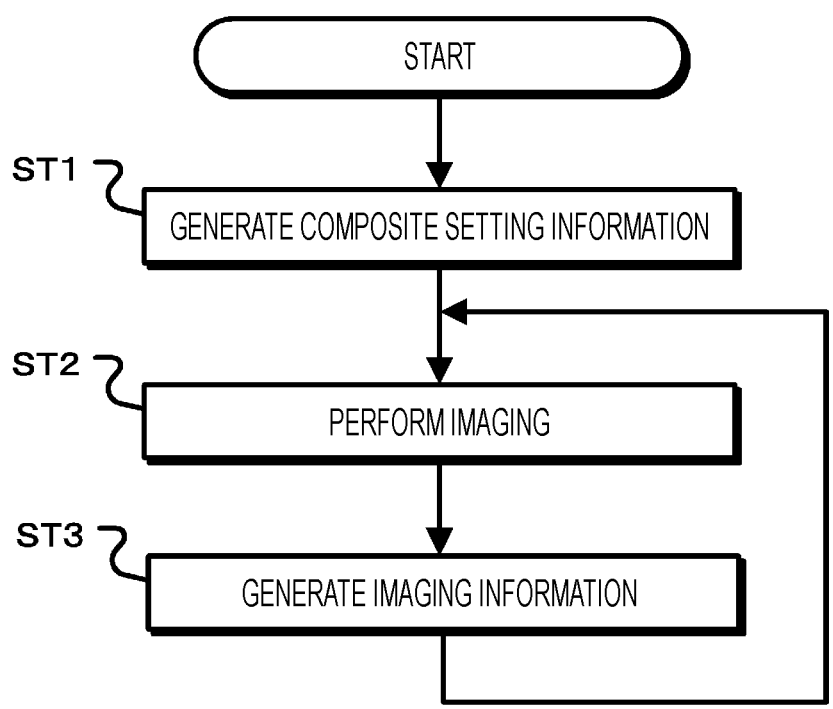
FIG. 2 is a flowchart showing an imaging process.

FIG. 2 is a flowchart showing an imaging process. In the imaging apparatus 10, the imaging units 11-1 through 11-$n$ of the captured image acquisition unit 11 and the information generation processing unit 124 of the imaging information generation unit 12 use the time code generated by the tame code generation unit 121, to acquire captured images and generate the imaging information.

In step ST1, the imaging apparatus 10 generates the composite setting information. The composite setting information generation unit 13 of the imaging apparatus 10 generates the composite setting information for joining the captured images acquired by the imaging units 11-1 through 11-$n$ in a continuous manner without causing any image shift.

In generating the composite setting information, the composite setting information generation unit 13 uses the physical layout information about the imaging units 11-1 through 11-$n$. The physical layout information is information for enabling determination of the imaging directions of the imaging units 11-1 through 11-$n$, and is input by the user in accordance with the physical layout, for example. Alternatively, in a case where the physical layout of the imaging units 11-1 through 11-$n$ is in a predetermined positional relationship, or where an attachment jig (such as a camera rig) is attached to the imaging units, and a predetermined positional relationship is set, for example, the physical layout information may be automatically generated in accordance with the attachment position. Also, in the captured image acquisition unit 11, physical layout information corresponding to the physical layout of the imaging units 11-1 through 11-$n$ may be stored in advance.

In generating the composite setting information, the composite setting information generation unit 13 also uses the lens information about the imaging units 11-1 through 11-$n$. The lens information is information that enables determination of the imaging regions of the imaging units 11-1 through 11-$n$, such as the focal length and the like. The lens information may be input by the user in accordance with the states of the lenses being used in the imaging units 11-1 through 11-$n$, or may be acquired from the imaging units 11-1 through 11-$n$.

The physical layout information is information that enables determination of the imaging directions of the imaging units 11-1 through 11-$n$, and the lens information is information that enables determination of the imaging regions of the imaging units 11-1 through 11-$n$. Accordingly, using the physical layout information and the lens information, the composite setting information generation unit 13 can determine which region in a spherical image is captured by which imaging unit, for example.

In generating the composite setting information, the composite setting information generation unit 13 also uses information about a projection method for projecting a wide-angle image such as a spherical image onto a two-dimensional plane. For example, a projection formula for transforming a spherical image into a two-dimensional planar image by an equidistant cylindrical projection method, an equal-area cylindrical projection method, or the like is used as information about the projection method.

In generating the composite setting information, the composite setting information generation unit 13 further uses image size information. Using the image size information, the composite setting information generation unit 13 sets the image size of the two-dimensional plane.

The information about the projection method indicates the correspondence relationship between positions in a spherical image and positions in a two-dimensional planar image, and the image size information indicates the image size of the two-dimensional planar image. Accordingly, the correspondence relationship between positions in the spherical image and positions in the two-dimensional planar image of the image size indicated by the image size information becomes apparent from the information about the projection method and the image size information.

In accordance with the physical layout information, the lens information, the information about the projection method, and the image size information, the composite setting information generation unit 13 determines to which region in the composite image as a two-dimensional plane of the image size indicated by the image size information each pixel of each captured image (equivalent to the image in a partial region in the spherical image) acquired by the imaging units 11-1 through 11-$n$ corresponds. The composite setting information generation unit 13 then generates the composite setting information indicating the correspondence relationship between the respective pixels in the captured images and the composite image. Where a composite image is generated in accordance with this composite setting information, the pixels indicating the same position in a sphere in a plurality of captured images are mapped on the position corresponding to the position in the sphere in the composite image. In view of this, imaging ranges are set so that a desired imaging range can be captured by at least one of the imaging units. In this manner, it is possible to generate a composite image of a desired imaging range in which captured images are continuously joined without any image shifting.

FIG. 3 shows an example of the correspondence relationship between the imaging regions and the regions in a two-dimensional plane in a case where six imaging units are used. For example, four imaging units are arranged so that the imaging directions have an angular difference of 90° with one another in the horizontal direction. Furthermore, one of the remaining two imaging units is disposed so that the imaging direction is a direction toward the top (zenith direction), and the other one of the two imaging units is disposed so that the imaging direction is a direction toward the ground (nadir direction). The six imaging units also perform imaging of regions Pa, Pb, Pc, and Pd in the horizontal direction shown in (a) of FIG. 3, a region Pe in the direction toward the top, and a region Pf (not shown) in the direction toward the ground, for example. It should be noted that the regions Pa, Pb, Pc, and Pd in the horizontal direction shown in (a) of FIG. 3 are obvious from the physical layout information and the lens information. Further, the correspondence relationship between the regions Pa, Pb, Pc, Pd, Pe, and Pf and the regions in the two-dimensional plane of the image size indicated by the image size information becomes apparent from the information about the projection method and the image size information. For example, in (b) of FIG. 3, a region Ga in a two-dimensional plane (a composite image) GP of the image size indicated by the image size information corresponds to the region Pa. Likewise, regions Gb, Gc, Gd, Ge, and Gf correspond to the regions Pb, Pc, Pd, Pe, and Pf. It should be noted that, in (b) of FIG. 3, the imaging direction extending through the center of the region Pc is the reference imaging direction, and this reference imaging direction is the center position of the two-dimensional plane.

The composite setting information generation unit 13 generates the composite setting information for continuously joining the captured images acquired by the plurality of imaging units without causing any image shifting, and the process then moves on to step ST2.

In step ST2, the imaging apparatus 10 performs imaging. In the captured image acquisition unit 11 of the imaging apparatus 10, the imaging units 11-1 through 11-*n* generate the image data of captured images. The captured image acquisition unit 11 also adds the time code supplied from the time code generation unit 121 of the imaging information generation unit 12 to the generated image data. The captured image acquisition unit 11 generates image data having the time code added thereto, and the process then moves on to step ST3.

In step ST3, the imaging apparatus 10 generates the imaging information. The imaging information generation unit 12 of the imaging apparatus 10 generates the imaging information that is meta information relating to the captured images. The imaging information has time-independent common data and time-dependent time series data.

The imaging information generation unit 12 generates data indicating the imaging start time as the time-independent common data, using the time information output from the clock unit 122, for example. The time-dependent time series data is data generated at predetermined time intervals. The time series data includes the time code generated by the time code generation unit 121 during the imaging, the imaging position information that is generated by the sensor unit 123 and indicates the latitude, the longitude, and the altitude of the imaging apparatus 10 (or the captured image acquisition unit 11), and the posture information indicating the orientations and elevation angles of the imaging units 11-1 through 11-*n*. It should be noted that the posture information is not necessarily information about each of the imaging units 11-1 through 11-*n*. As long as the posture information about the imaging unit serving as the reference imaging unit is obtained, it is possible to calculate the posture information about the other imaging units in accordance with the physical layout information.

FIG. 4 shows an example of the time series data of the imaging information. The time series data includes the time code generated by the time code generation unit 121, the information that is generated by the sensor unit 123 and indicates the latitude, the longitude, and the altitude of the imaging apparatus 10, and the posture information (orientations and elevation angles, for example) about one imaging unit that is designated in advance. It should be noted that, in FIG. 4, abbreviations indicating orientations are also shown.

After the imaging information is generated, if the imaging apparatus 10 determines that there is no user operation indicating the end of the imaging or there are no instructions from outside (hereinafter referred to as "user operation or the like"), the imaging apparatus 10 returns to step ST2. If the imaging apparatus 10 determines that there is an instruction indicating the end of the imaging, the imaging apparatus 10 ends the imaging process.

Figure 5:
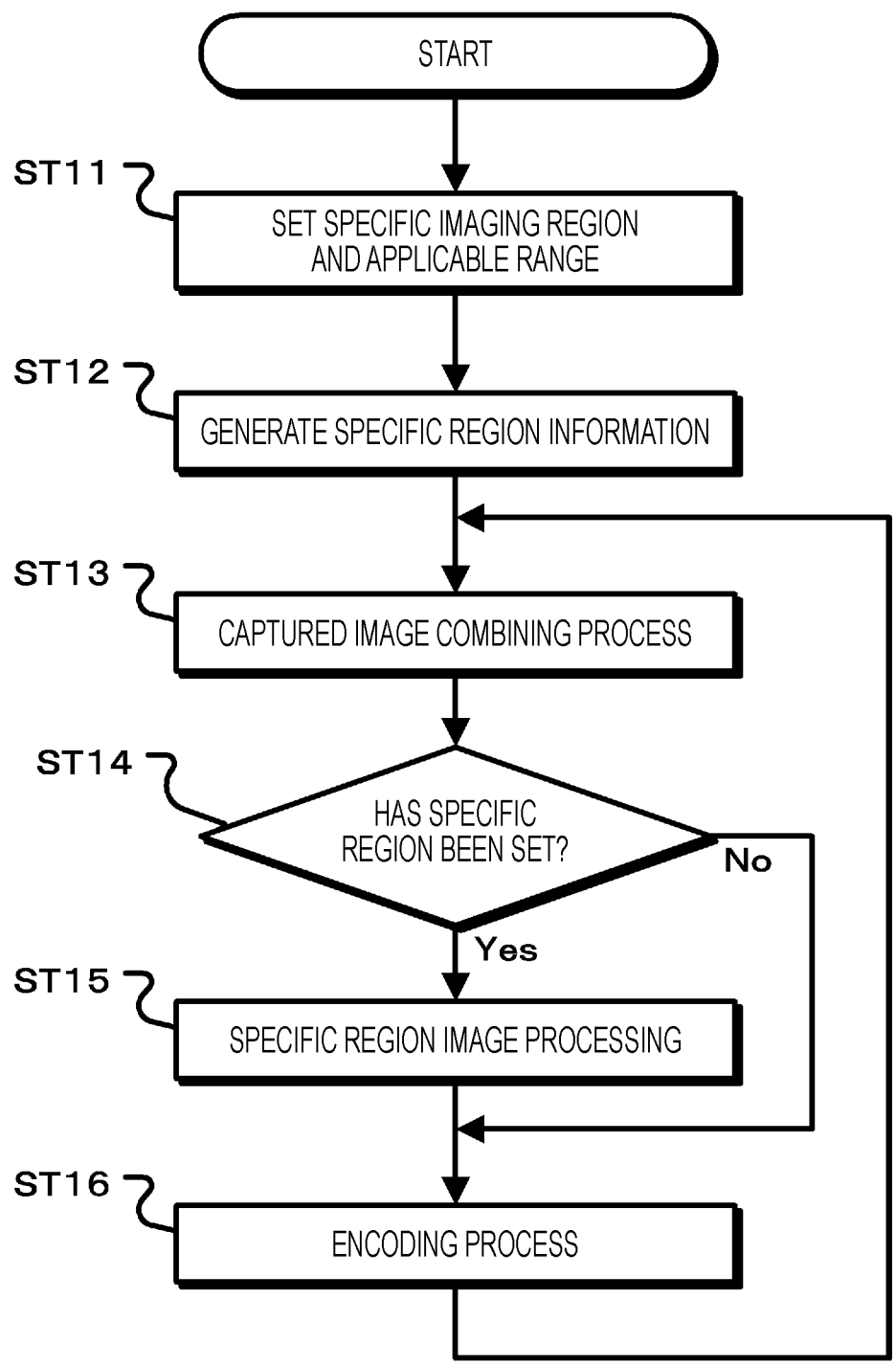
FIG. 5 is a flowchart showing a captured image combining/specific region process.

Next, a captured image combining/specific region process is described. FIG. 5 is a flowchart showing the captured image combining/specific region process. In a case where the captured image combining/specific region process is started, the imaging process shown in FIG. 2 is performed, so that the image data of captured images is generated in the imaging units 11-1 through 11-*n* of the captured image acquisition unit 11, the imaging information is generated in the imaging information generation unit 12, and the composite setting information is generated in the composite setting information generation unit 13.

In step ST11, the imaging apparatus 10 sets a specific imaging region and an application range. For example, the specific region information generation unit 14 of the imaging apparatus 10 sets an imaging region including a non-target object as the specific imaging region.

The specific region information generation unit 14 sets the imaging region of the imaging unit designated by a user operation or the like as the specific imaging region. In a case where the imaging unit is designated by a user operation or the like using the identification information assigned to the imaging unit, the specific region information generation unit 14 sets the imaging region of the designated imaging unit as the specific imaging region. For example, in a case where the identification information about the imaging unit designated by a user operation or the like indicates the imaging unit that images the direction toward the top in FIG. 3, the region Pe is set as the specific imaging region.

Furthermore, in a case where apex angles and corner angles indicating an imaging region are designated by a user operation or the like, the specific region information generation unit 14 sets the region surrounded by the designated apex angles and corner angles as the specific imaging region. For example, in a case where the coordinates (apex angle: 45°, corner angle: 45°), (apex angle: 90°, corner angle: 45°), (apex angle: 45°, corner angle 90°), and (apex angle: 90°, corner angle: 90°) are designated in a coordinate system having an imaging position as the reference position, the designated coordinate region is set as the specific imaging region.

Figure 6:
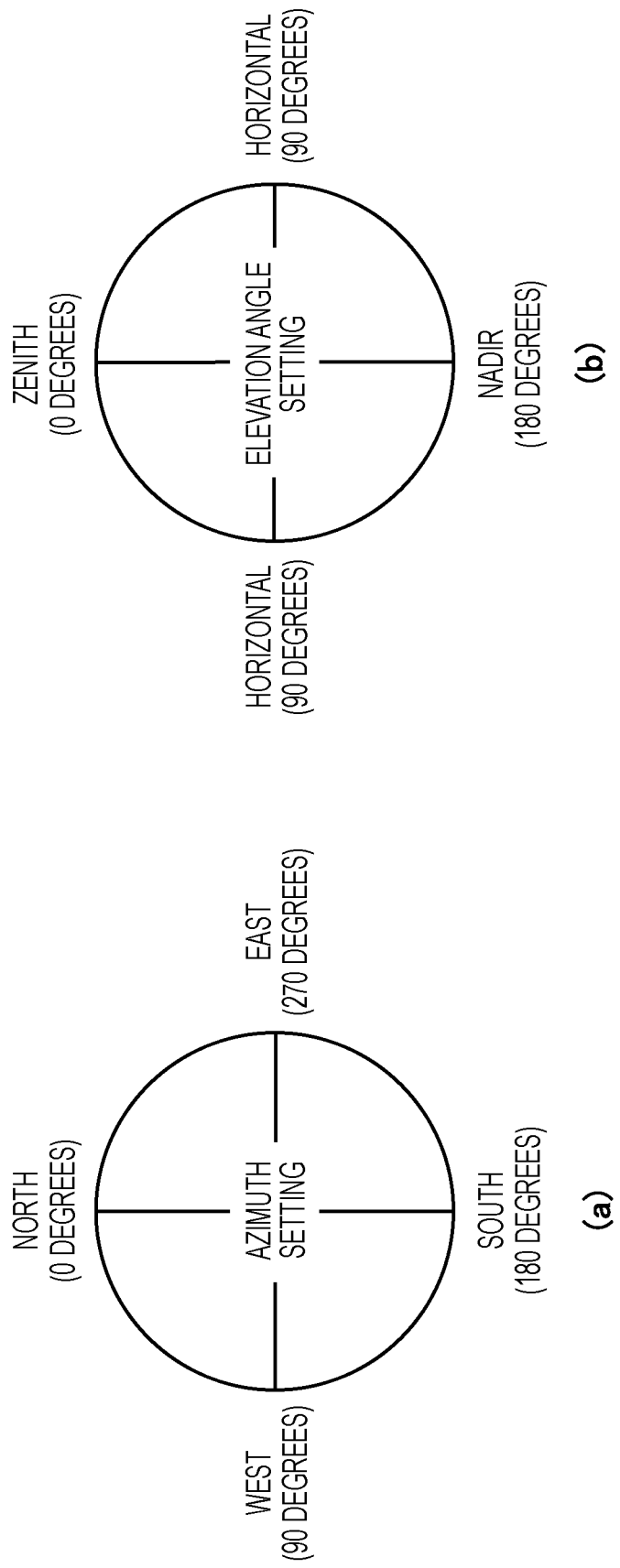
FIG. 6 is a diagram for explaining setting of a specific imaging region.

Alternatively, in a case where directions and elevation angles in the real world are designated by a user operation or the like, the specific region information generation unit 14 sets the region indicated by the designated orientations and elevation angles as the specific imaging region. FIG. 6 is a diagram for explaining the setting of a specific imaging region. For example, as shown in (a) of FIG. 6, the range of orientations designated by the user or the like in accordance with an orientation setting instruction is set as the specific imaging region. Also, as shown in (b) of FIG. 6, the range of the elevation angles designated by the user or the like in accordance with an elevation angle setting instruction is set as the specific imaging region.

Figure 7:
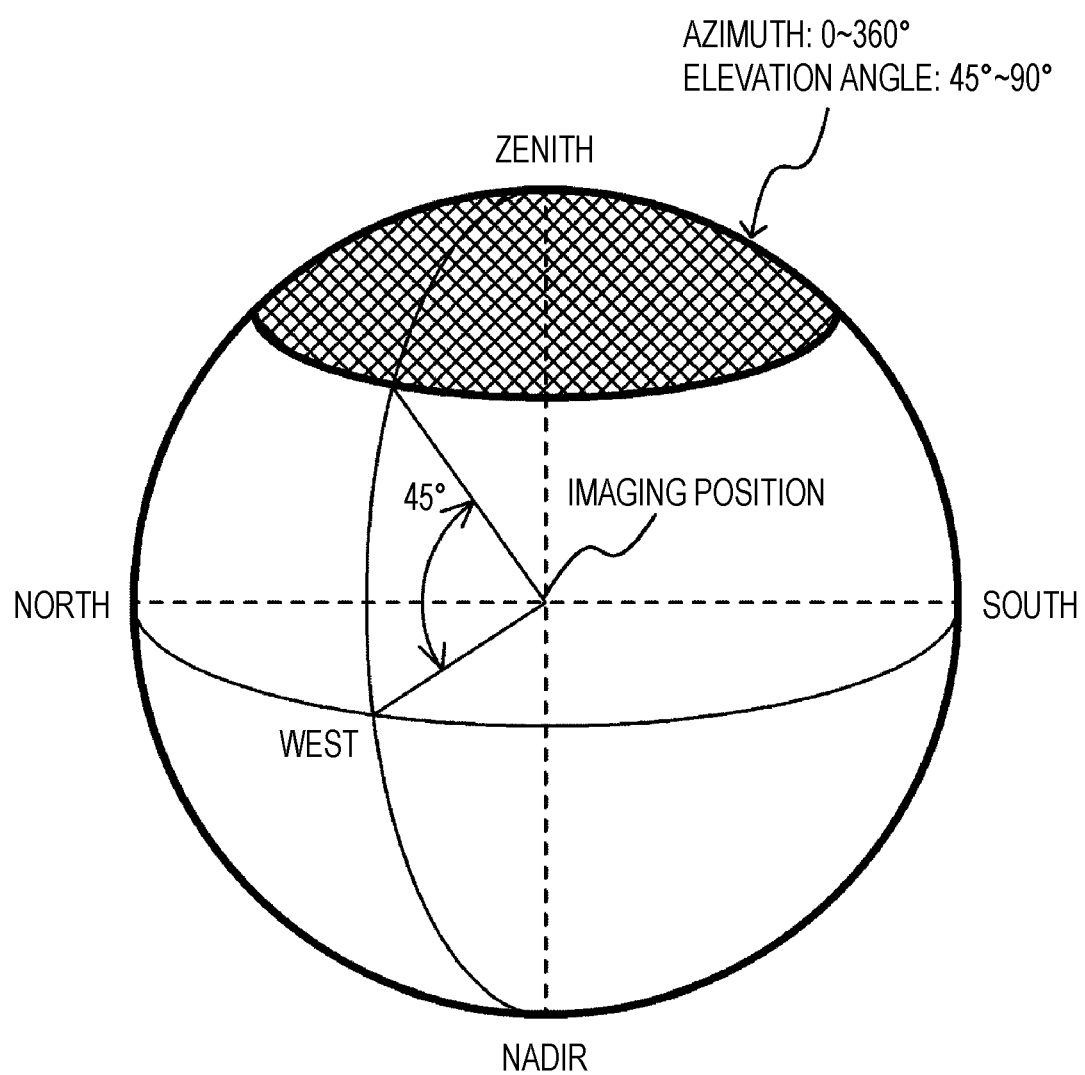
FIG. 7 is a diagram showing an example of a specific imaging region in a case where a range of orientations and a range of elevation angles are designated.
Figure 8:
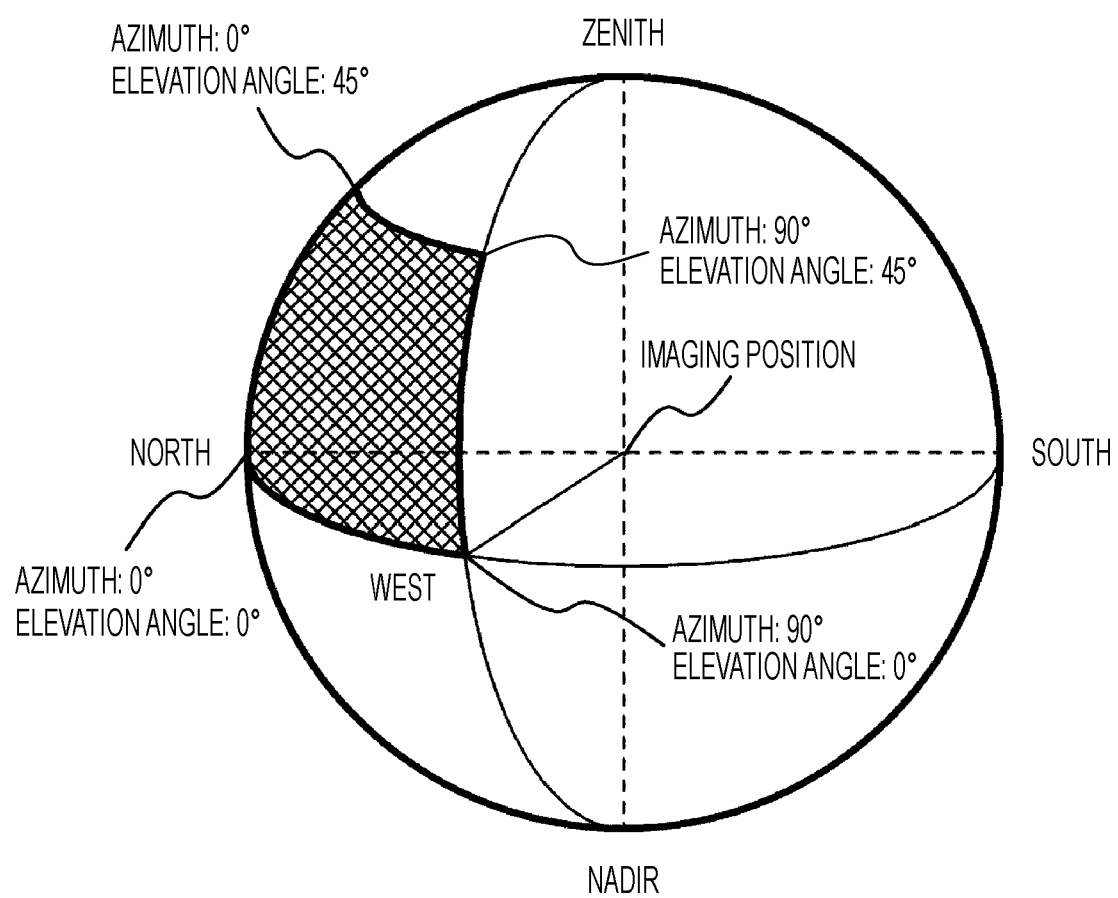
FIG. 8 is a diagram showing an example of a specific imaging region in a case where coordinates are designated.

FIG. 7 shows an example of a specific imaging region in a case where a range of orientations and a range of elevation angles are designated. For example, in a case where an orientation range (0° to 360°) and an elevation angle range (0° to 45°) are designated, the shaded region is set as the specific imaging region, with its center being the imaging position. FIG. 8 shows an example of a specific imaging region in a case where coordinates are designated. For example, in a case where the coordinates (orientation: 0°, elevation angle: 45°), (orientation: 0°, elevation angle: 0°), (orientation: 90°, corner angle: 0°), and (orientation: 90°, elevation angle: 45°) are designated, the shaded region is the specific imaging region, with its center being the imaging position.

The specific region information generation unit 14 also sets an application range. In the setting of the application range, the application range in which image processing is to be performed is designated with the time information and the imaging position, for example, in an image of the specific region corresponding to the specific imaging region in a composite image. In accordance with a user operation or the like, the specific region information generation unit 14 designates the time for performing image processing on the image of the specific region. As for the designation of the time, the time may be designated with an absolute time such as UTC, for example, or may be designated with a relative time such as the time elapsed since the start of the imaging, for example. Further, as for the designation of the time, either the start time or the end time of the application range may be designated, or the start time and the end time may be designated.

In accordance with a user operation or the like, the specific region information generation unit 14 also designates the imaging position of the application range for performing image processing on the image of the specific region. In specifying the imaging position, the specific region information generation unit 14 designates one or more of a latitude, a longitude, and an altitude For example, three sets of coordinates (latitude: N35, longitude: E139), (latitude: N35, longitude: E140), and (latitude: N40, longitude: P139) are designated, so that the region surrounded by the three sets of coordinates is set as the application range. Alternatively, an altitude (30 m or lower, for example) may be designated, and the designated range of altitudes may be set as the application range.

The imaging apparatus 10 sets the specific imaging region and the application range as described above, and then moves onto step ST12 in FIG. 5, to generate the specific region information. The specific region information generation unit 14 of the imaging apparatus 10 generates the specific region information in accordance with the settings of the specific imaging region and the application range.

The specific region information includes the region setting information and the application range information. The region setting information is information indicating the specific region in the composite image, and the application range information is information indicating the application range of the image processing for the specific region indicated by the region setting information.

The specific region information generation unit 14 generates the region setting information that is a group of coordinates indicating the specific region corresponding to the specific imaging region in the composite image obtained by joining the captured images.

In a case where the specific imaging region is designated with the identification information about the imaging units, the specific region information generation unit 14 calculates the group of coordinates of the composite image of the captured images acquired by the imaging units corresponding to the identification information, in accordance with the composite setting information generated by the composite setting information generation unit 13. The specific region information generation unit 14 sets the information indicating the calculated coordinate group as the region setting information.

Further, in a case where the specific imaging region is set with apex angles and corner angles, the specific region information generation unit 14 calculates the group of coordinates of the composite image corresponding to the specific imaging region indicated by the apes angles and the corner angles, in accordance with the composite setting information generated by the composite setting information generation unit 13. The specific region information generation unit 14 sets the information indicating the calculated coordinate group as the region setting information.

Alternatively, in a case where the specific imaging region is set with orientations and elevation angles, the specific region information generation unit 14 associates the composite image with the captured images acquired by the respective imaging units, in accordance with the composite setting information generated by the composite setting information generation unit 13. The specific region information generation unit 14 also determines the orientation and the elevation angle of each imaging unit for each time code, in accordance with the imaging information generated by the imaging information generation unit. In accordance with the determined orientations of the imaging units, the specific region information generation unit 14 also determines which region of the captured image acquired by which imaging unit the specific imaging region corresponds to. Further, the specific region information generation unit 14 calculates the group of coordinates of the composite image corresponding to the specific imaging region indicated by the orientations and the elevation angles, in accordance with the association between the captured images acquired by the imaging units and the composite image, and the correspondence relationship between the specific imaging region and the captured images acquired by the imaging units. The specific region information generation unit 14 sets the information indicating the calculated coordinate group as the region setting information.

The specific region information generation unit 14 also generates the specific region information including the region setting information indicating the specific imaging region in the composite image and the application range information indicating the setting of the application range.

FIG. 9 shows an example of the specific region information. In the specific region information, the latitudes, the longitudes, and the altitudes as the application range information in a case where image processing is performed on the specific region are shown for respective time codes, for example. Meanwhile, in the region setting information, the groups of coordinates of the specific region corresponding to the specific imaging region in the composite image is shown for the respective time codes. It should be noted that FIG. 9 shows an example case where two specific regions AR1 and AR2 are set, and coordinate groups are calculated for the two specific regions. Further, the coordinate values (the horizontal-direction pixel positions and the vertical-direction pixel positions) of the four corners indicating the regions of the coordinate groups are shown as coordinate group information. It should be noted that the application range information may include the start time and the end time as described above.

The imaging apparatus 10 generates the specific region information as described above, and then moves on to step ST13 in FIG. 5, to perform a captured image combining process. In accordance with the composite setting information generated by the composite setting information generation unit 13, the captured image combining unit 21 of the imaging apparatus 10 performs a joining process (a stitching process) for the captured images acquired by the imaging units 11-1 through 11-*n* of the captured image acquisition unit 11. In the joining process, captured images having the same time code are joined, so that one composite image is generated. The imaging apparatus 10 generates the composite image, and then moves on to step ST14.

In step ST14, the imaging apparatus 10 determines whether a specific region has been set. In accordance with the specific region information, the captured image combining unit 21 determines whether a specific region has been set for the composite image. In a case where the coordinate group of the specific region is indicated by the specific region information of the time code equal to that of the composite image, the captured image combining unit 21 determines that the specific region has been set, and the process then moves on to step ST15. In a case where the coordinate group of the specific region is not indicated by the specific region information of the time code equal to that of the composite image, on the other hand, the captured image combining unit 21 determines that the specific region has not been set, and the process then moves on to step ST16.

In step ST15, the imaging apparatus 10 performs image processing on the specific region. The captured image combining unit 21 invalidates the image of the specific region by deleting the image data of the specific region or replacing the image data of the specific region with invalid image data, for example. The process then moves on to step ST16.

In step ST16, the imaging apparatus 10 performs an encoding process. The encoding processing unit 22 of the imaging apparatus 10 reduces the data amount by performing the encoding process using the composite image generated by the captured image combining unit 21 or the image data of the composite image subjected to the image processing of the specific region. The process then returns to step ST13.

It should be noted that the imaging apparatus 10 repeats the processes in steps ST13 through ST16 until the imaging as completed. The processes an steps ST13 through ST16 are also performed for each frame. Further, the processes in steps ST13 through ST16 are not necessarily performed in the order of the steps, but may be performed by pipeline processing or parallel processing. Alternatively, the encoded data after the encoding process may be output to an external device.

As described above, in the information processing device of the present technology, it is possible to generate a specific region information indicating the specific region corresponding to the specific imaging region in the composite image obtained by joining captured images acquired by a plurality of imaging units. Accordingly, with the generated specific region information, it is possible to easily process an image of the specific region in the composite image obtained by joining the captured images acquired by the plurality of imaging units. For example, if the information processing device of this technology is used in an imaging apparatus, a composite image in which an image of a non-target object is invalidated can be output from the imaging apparatus.

Also, as the specific imaging region can be set in accordance with the identification information about the imaging apparatus, apex angles and corner angles, orientations and elevation angles, or the like, the imaging region or the like of a non-target object can be easily set as a specific imaging region, for example.

Also, as the specific region information includes application range information, it is possible to set a time range in which image processing is performed on the specific region, and thus, processing with a high degree of freedom can be performed. Further, the imaging information associated with the composite image includes imaging position information including latitude, longitude, and altitude, and the imaging position information can be included in the application range information. Thus, it is possible to control the image processing on the specific region in accordance with the imaging position. For example, where the imaging position is low, the current object to be invalidated is hidden by a building or the like, and does not appear in captured images. Where the imaging position is high, however, the current object to be invalidated appears in captures images in some cases. In such cases, if altitude information is included in the application range information, and the image processing is not performed on the specific region in a case where the imaging position is equal to or lower than a predetermined altitude, it is possible to prevent imaging processing from being performed on the specific region even though the current object to be invalidated is not included in the specific imaging region since the imaging position is low.

<2. Configuration and Operation of an Image Reproduction Apparatus>

Meanwhile, the image processing of the specific region is not necessarily performed by an imaging apparatus, but may be performed by an external apparatus. In this case, the image data of a composite image not subjected to the image processing of the specific region, and the encoded data generated by performing an encoding process on the image data are associated with the specific region information and the like, and are then output to an external apparatus. In the output to the external apparatus, the image data or the encoded data may be multiplexed with the specific region information and the like, and be then output. For example, the image data or the encoded data, the specific region information, and the like may be stored into the storage unit 31 that is detachable, and be then output via the storage unit 31.

<2-1. First. Configuration and Operation of an Image Reproduction Apparatus>

Next, a case where image processing of a specific region is performed at the time of image reproduction using an image reproduction apparatus as an external apparatus as described. In a first configuration and operation of the image reproduction apparatus, a case where the specific region in a composite image is combined with a texture is described. It is to be noted that the image reproduction apparatus performs a reproduction operation using encoded data of a composite image and specific region information in this example. Further, the specific region information includes texture generation information for generating a texture, for example. The texture generation information is generated in advance at the destination or the like of the composite image, for example.

Figure 10:
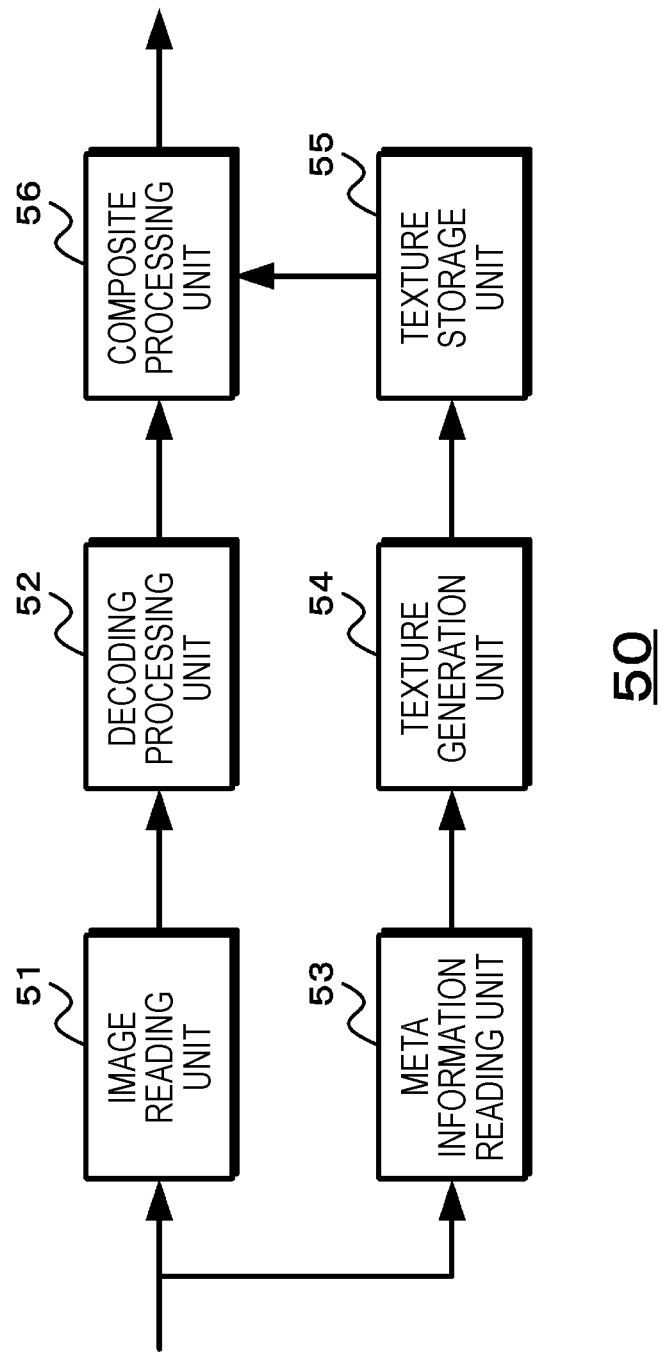
FIG. 10 is a diagram showing a first configuration of an image reproduction apparatus.

FIG. 10 shows an example of the first configuration of the image reproduction apparatus. The image reproduction apparatus 50 includes an image reading unit 51, a decoding processing unit 52, a meta information reading unit 53, a texture generation unit 54, a texture storage unit 55, and a composite processing unit 56.

The image reading unit 51 reads encoded data, for example. The image reading unit 51 reads encoded data from multiplexed data, a storage unit, or the like, and outputs the read encoded data to the decoding processing unit 52.

The decoding processing unit 52 performs a decoding process on the encoded data read by the image reading unit 51, and generates image data of a composite image. The decoding processing unit 52 outputs the generated image data to the composite processing unit 56.

The meta information reading unit 53 reads meta information. The meta information reading unit 53 reads the meta information associated with the encoded data from multiplexed data, a storage unit, or the like, and outputs the meta information to the texture generation unit 54.

The texture generation unit 54 generates a texture. The texture generation unit 54 generates a texture in accordance with the texture generation information included in the specific region information read by the meta information reading unit 53, for example. The texture generation unit 54 stores the generated texture into the texture storage unit 55.

The composite processing unit 56 is a reproduction control unit that performs reproduction control on a specific region in the composite image. The composite processing unit 56 reads the texture corresponding to the composite image from the texture storage unit 55, and combines the read texture with the specific region in the composite image of the image data generated by the decoding processing unit 52. By doing so, the composite processing unit 56 performs control so that the image of the specific region is not reproduced as it is. The composite processing unit 56 outputs the image data of the composite image subjected to the reproduction control for the specific region.

Figure 11:
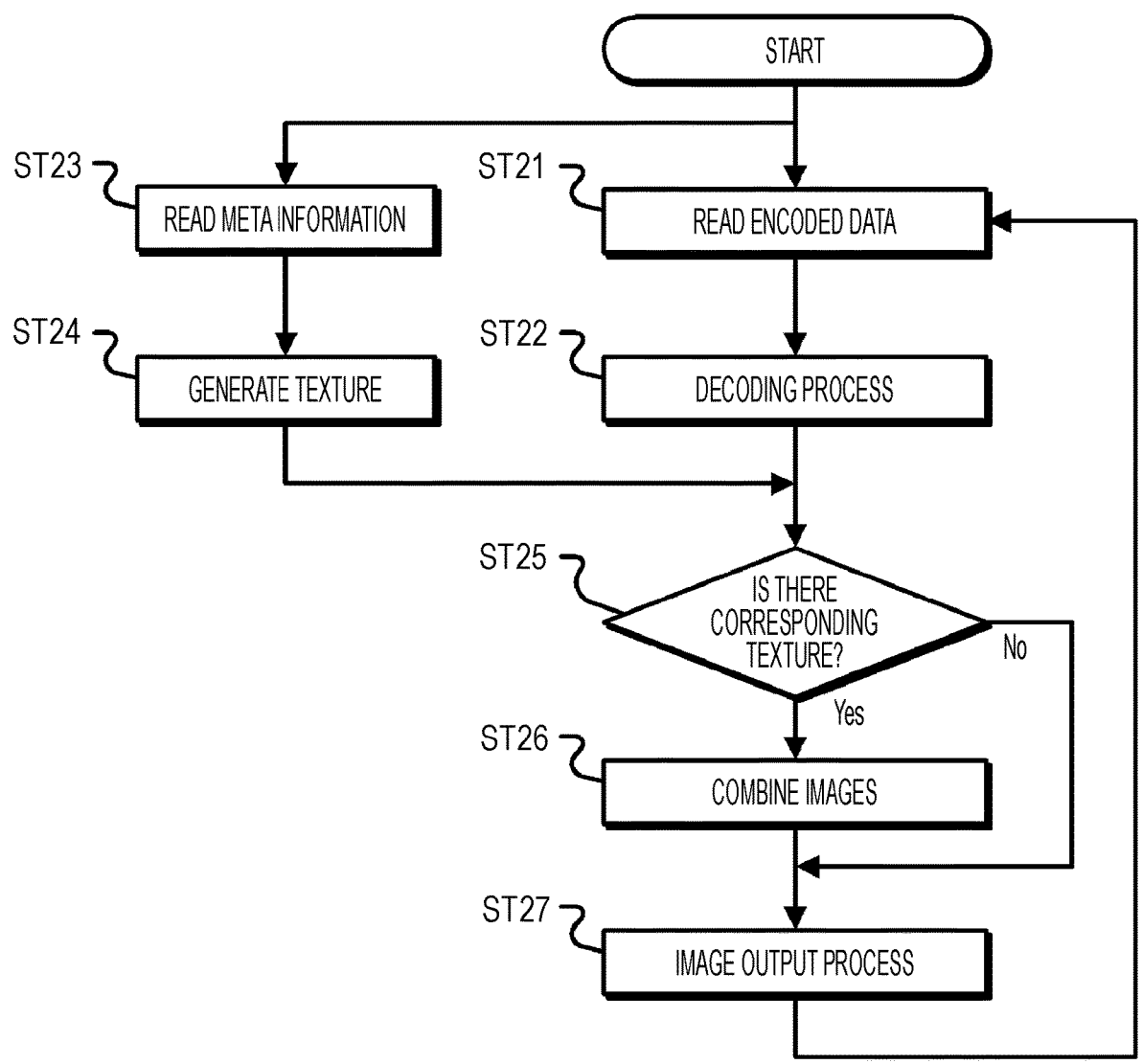
FIG. 11 is a flowchart showing an operation of the first configuration of the image reproduction apparatus.

FIG. 11 is a flowchart showing the operation of the first configuration of the image reproduction apparatus. It should be noted that the description below is made on the assumption that encoded data of and specific region information about the composite image can be acquired in the image reproduction apparatus 50.

In step ST21, the image reproduction apparatus 50 reads the encoded data. The image reading unit 51 of the image reproduction apparatus 50 reads the encoded data from multiplexed data, a storage unit, or the like, and the operation moves on to step ST22.

In step ST22, the image reproduction apparatus 50 performs a decoding process. The decoding processing unit 52 of the image reproduction apparatus 50 performs a decoding process on the encoded data read in step ST21, to generate image data of the composite image. The operation then moves on to step ST25.

In step ST23, the image reproduction apparatus reads meta information. The meta information reading unit 53 of the image reproduction apparatus 50 reads the meta information associated with the encoded data, from multiplexed data, a storage unit, or the like, and the operation then moves on to step ST24.

In step ST24, the image reproduction apparatus 50 generates a texture. The texture generation unit 51 of the image reproduction apparatus 50 generates a texture in accordance with the texture generation information included in the meta information read in step ST23. The texture generation unit 54 also stores the generated texture into the texture storage unit 55, and the operation then moves on to step ST25.

In step ST25, the image reproduction apparatus 50 determines whether there is the corresponding texture. The composite processing unit 56 of the image reproduction apparatus 50 determines whether the texture corresponding to the composite image generated in step ST22 is stored in the texture storage unit 55. In a case where a texture having the same time code as that of the generated composite image is stored in the texture storage unit 55, for example, the composite processing unit 56 determines that there is the corresponding texture. The operation then moves on to step ST26. If a texture having the same time code is not stored in the texture storage unit 55, on the other hand, the composite processing unit 56 determines that there is no corresponding texture. The operation then moves on to step ST27.

In step ST26, the image reproduction apparatus 50 combines images. The composite processing unit 56 of the image reproduction apparatus 50 combines the texture having the same time code as that of the composite image with an image of the specific region, and the operation then moves on to step ST27.

In step ST27, the image reproduction apparatus 50 performs an image output process. The composite processing unit 56 of the image reproduction apparatus 50 outputs the image data of the composite image in which the texture is combined with the specific region, or the image data of the composite image to a display device or the like in a case where there is no corresponding texture.

It should be noted that, in the first configuration and operation of the image reproduction apparatus 50, the texture generation information for generating a texture is included in the specific region information. However, texture generation information for generating various textures may be included in the imaging information. In this case, the imaging information and the specific region information are output together to the image reproduction apparatus 50, and the information for designating the texture to be combined is included in the specific region information. In this manner, a texture selected from various textures can be combined with an image of the specific region in the composite image.

<2-2. Second Configuration and Operation of an Image Reproduction Apparatus>

Next, a second configuration and operation of an image reproduction apparatus are described. In the second configuration and operation of an image reproduction apparatus, a case where image data output control is performed in the specific region in a composite image is described. It is to be noted that the image reproduction apparatus performs a reproduction operation using encoded data of a composite image and meta information such as specific region information in this example.

Figure 12:
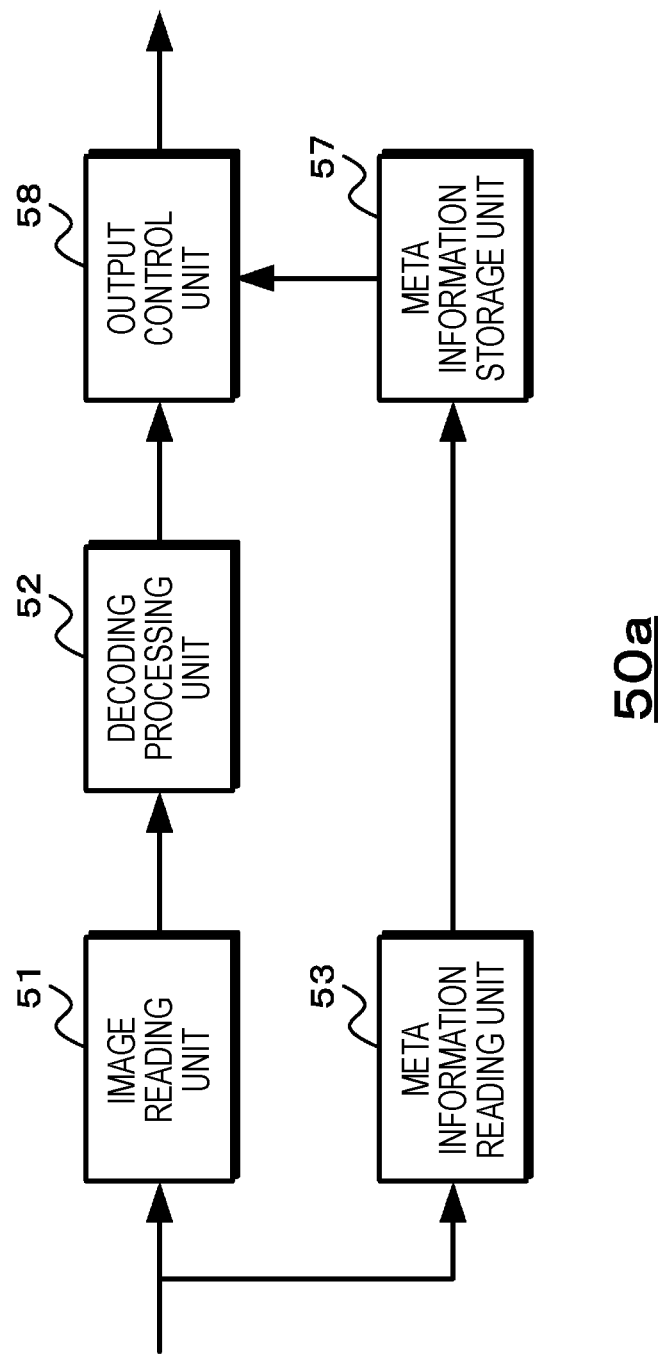
FIG. 12 is a diagram showing a second configuration of the image reproduction apparatus.

FIG. 12 shows an example of the second configuration of the image reproduction apparatus. The image reproduction apparatus 50a includes an image reading unit 51, a decoding processing unit 52, a meta information reading unit 53, a meta information storage unit 57, and an output control unit 56.

The image reading unit 51 reads encoded data. The image reading unit 51 reads the encoded data from multiplexed data, a storage unit, or the like, and outputs the read encoded data to the decoding processing unit 52.

The decoding processing unit 52 performs a decoding process on the encoded data read by the image reading unit 51, and generates image data of a composite image. The decoding processing unit 52 outputs the generated image data to the output control unit 58.

The meta information reading unit 53 reads meta information. The meta information reading unit 53 reads the meta information corresponding to the encoded data from multiplexed data, a storage unit, or the like, and outputs the meta information to the meta information storage unit 57. The meta information storage unit 57 stores the meta information read by the meta information reading unit 53.

The output control unit 58 is a reproduction control unit that performs reproduction control on a specific region in the composite image. When outputting the image data generated by the decoding processing unit 52, the output control unit 58 determines whether the pixels of the image data to be output are pixels of the specific region, in accordance with the specific region information stored in the meta information storage unit 57. In a case where the pixels of the image data to be output are not pixels of the specific region, the output control unit 58 outputs the image data generated by the decoding processing unit 52. In a case where the pixels of the image data to be output are pixels of the specific region, on the other hand, the output control unit 58 stops outputting the pixel data generated by the decoding processing unit 52 or replaces the pixel data with preset pixel data. By doing so, the output control unit 58 performs control so that any image of the specific region is not reproduced. The output control unit 58 outputs the image data of the composite image on which the reproduction control for the specific region has been performed.

Figure 13:
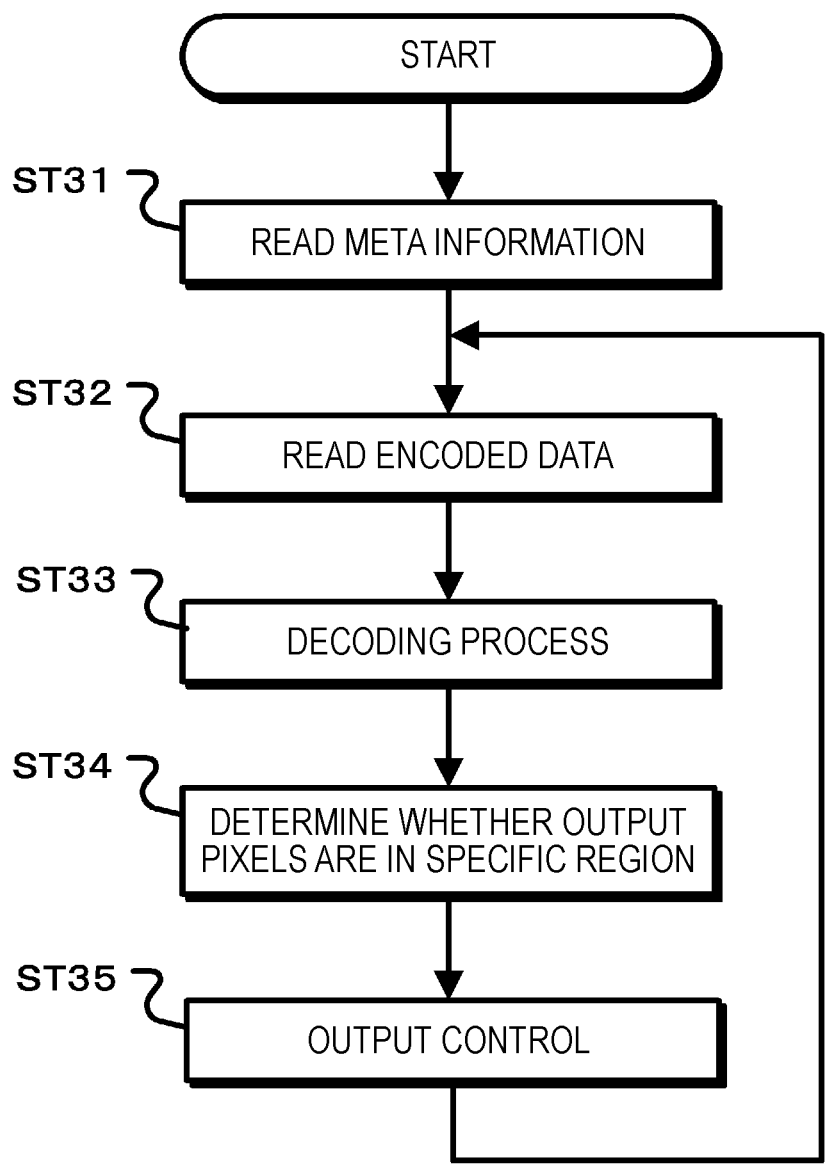
FIG. 13 is a flowchart showing an operation of the second configuration of the image reproduction apparatus.

FIG. 13 is a flowchart showing the operation of the second configuration of the image reproduction apparatus. It should be noted that the description below is made on the assumption that encoded data of and specific region information about the composite image can be acquired in the image reproduction apparatus 50a.

In step ST31, the image reproduction apparatus reads the meta information. The meta information reading unit 53 of the image reproduction apparatus 50a reads the meta information associated with encoded data from multiplexed data, a storage unit, or the like, and stores the read meta information into the meta information storage unit 57. The operation then moves on to step ST32.

In step ST32, the image reproduction apparatus 50a reads the encoded data. The image reading unit 51 of the image reproduction apparatus 50a reads the encoded data from multiplexed data, a storage unit, or the like, and the operation then moves on to step ST33.

In step ST33, the image reproduction apparatus 50a performs a decoding process. The decoding processing unit 52 of the image reproduction apparatus 50a performs a decoding process on the encoded data read in step ST32, to generate the image data of the composite image. The operation then moves on to step ST34.

In step ST34, the image reproduction apparatus 50a determines whether the pixels to be output are of the specific region. The output control unit 58 of the image reproduction apparatus 50a determines whether the pixels of the image data to be output are pixels in the specific region, in accordance with the specific region information that is stored in the meta information storage unit 57 and has the same time code as that of the image data to be output. The operation then moves on to step ST35.

In step ST35, the image reproduction apparatus 50a performs output control. In a case where the pixels to be output are not pixels of the specific region, the output control unit 58 of the image reproduction apparatus 50a outputs the image data generated by the decoding process. In a case where the pixels to be output are pixels of the specific region, on the other hand, the output control unit 58 stops outputting the image data, or replaces the image data generated by the decoding processing unit 52 with preset image data, and then outputs the preset image data. By performing such a process, the output control unit 58 can output the image data of the composite image having the output control performed on the image of its specific region, from the image reproduction apparatus.

Where the above process is performed, it is possible to perform reproduction control on an image of the specific region in a composite image in accordance with the specific region information in the image reproduction apparatus.

<3. Modifications of Imaging Information and Specific Region Information>

Next, a first modification of imaging information and specific region information is described. The above described specific region information generation unit 14 sets a specific region that is the region of a composite image corresponding to a specific imaging region determined in accordance with the identification information about the imaging units or the like. However, specific region information may be generated for each restriction level at a time of reproduction of a composite image.

For example, in a case where a specific region is set in accordance with the level of provision of a service for providing a composite image, the provider of the composite image generates specific region information with the specific region information generation unit 14 in accordance with the billing agreement with the user of the composite image, for example. Specifically, the specific region information for a non-charged user is invalidated, as "AR1 percent" of the composite image is set as the specific region. Furthermore, the specific region information for a non-charged user may include information for displaying a texture such as guidance information recommending payment contracts, guidance information about other image content, and advertisement information, in an invalidated specific region. The specific region information for a charged general user is information for invalidating "AR2 (<AR1) percent" of the composite image as a specific region. Furthermore, the specific region information for a charged general user may include information for displaying a texture such as guidance information recommending premium contracts, guidance information about other image content, and advertisement information, in an invalidated specific region. The specific region information for a charged premium user is information for setting no specific regions. Further, a composite image may be generated with a plurality of content images as the captured images acquired by a plurality of imaging units and display information about the content or the like, and specific region information for identifying the content to be invalidated in accordance with the payment agreement with the user of the composite image may be generated.

As described above, specific region information is generated for each restriction level at a time of reproduction of a composite image, and appropriate specific region information is selected. Thus, reproduction of the composite image can be restricted in accordance with the selected specific region information.

Next, a second modification is described. In the second modification, imaging information and specific region information are generated in accordance with the imaged object and its position, audio/text data, command information, or the like the like.

The imaging information generation unit 12 incorporates positional information about the imaged object and the other objects in the captured images into the time series data of the imaging information. Alternatively, imaged objects may be classified into categories (such as people, buildings, animals, plants, symbols, for example), and the classification results may be incorporated into the time series data. It should be noted that the process of classifying objects into types may be automatically performed by an image recognition technique, or the type of each object may be identified by the user.

FIG. 14 shows an example of the time series data of the imaging information. The time series data is generated for each time code, for example. It should be noted that, in FIG. 14, captured images are acquired with imaging units 11-1 through 11-5. Furthermore, the coordinates (x, y) and (x', y') indicate the coordinates of the smallest rectangular region containing an object.

For example, at a time code "00:00:00:01", the imaging unit 11-1 images a person A, and the image region of the person. A is located at the coordinates (x1, y1), (x1', y1') in the image. The imaging unit 11-2 images a person B, and the image region of the person B is at the coordinates (x2, y2), (x2', y2') in the image. The imaging unit 11-3 images a building A, and the image region of the building A is at the coordinates (x5, y5), (x5', y5') in the image. The imaging unit 11-4 images a dog A, and the image region of the dog A is at the coordinates (x8, y8), (x8', y8') in the image.

Figure 15:
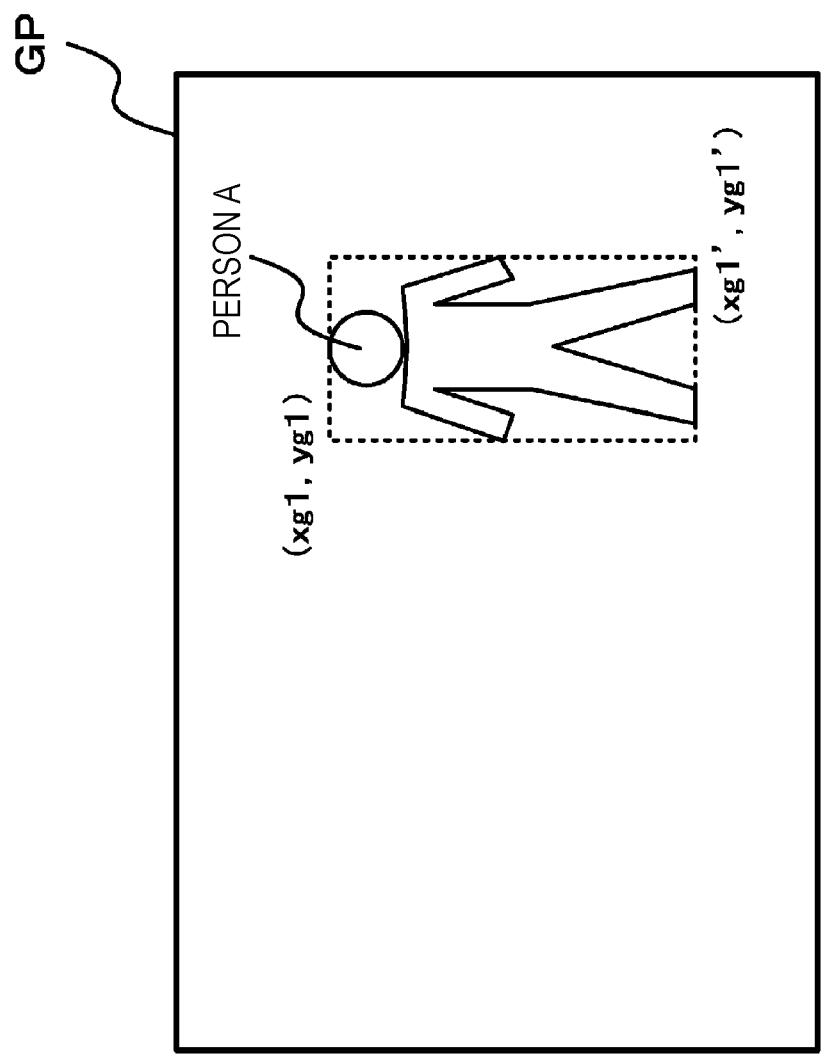
FIG. 15 is a diagram showing an example of the specific region corresponding to a person A.

The specific region information generation unit 14 sets a specific region that is the region of a composite image including a predetermined object. For example, in a case where the person A imaged by the imaging unit 11-1 is detected through an object recognition process or the like in FIG. 14, the specific region is set in accordance with the person A as shown in FIG. 15. For example, the rectangular region indicated by the coordinates (xg1, yg1), (xg1', yg1') of the person A in a composite image GP is set as the specific region.

Alternatively, the imaging information and the specific region information may be generated in accordance with audio data. In this case, the imaging information generation unit 12 converts audio data indicating the sound picked up by a microphone into text data, and sets the text data as the time series data of the imaging information. It should be noted that FIG. 16 shows an example of the time series data of the imaging information generated in accordance with audio data, and shows the text data of sounds picked up by microphones A through C at the times indicated by the time codes.

The specific region information generation unit 15 defines the relationship between text data and specific regions in advance, and generates the specific region information in accordance with recognized text data. For example, the text data "A on" is an instruction to set the imaging range of an imaging unit A as a specific region. The text data "A off" is an instruction to cancel the setting of the specific region that is the imaging range of the imaging unit A. Further, the text data "all on" is an instruction to set the imaging ranges of all the imaging units as the specific regions.

Further, the text data "all off" is an instruction to cancel all the setting of the specific regions. The specific region information generation unit 15 sets or cancels a specific region in accordance with an instruction corresponding to text data based on sound picked up by a microphone.

Alternatively, the imaging information and the specific region information may be generated in accordance with command information from an external device (such as a remote control device). In this case, the imaging information generation unit 12 uses the command information from an external device or a remote control device as the imaging information. The specific region information generation unit 15 defines the regions corresponding to command information in advance, and generates the specific region information for setting a specific region that is the region corresponding to command information supplied from an external device.

Further, the specific region information may be generated in accordance with position information about objects and the imaging information. For example, the position information about an object indicates the specific region of a composite image, which is the latitude range, the longitude range, and the altitude of the object. Furthermore, the imaging information indicates the latitude, the longitude, and the altitude of the imaging position. In this case, from the relationship between the position of the object as the specific region and the imaging position, it is possible to determine in which imaging direction the object is located with respect to the imaging position. Further, the view angle range corresponding to the latitude range and the longitude range of the object can be calculated in accordance with the lens information of the imaging information, the latitude range and the longitude range of the object, the distance to the object, and the like. Accordingly, if the calculated view angle range in the determined orientation of the object is set as the specific imaging region of the object, it is possible to generate the specific region information indicating the object's specific region that indicates the latitude range, the longitude range, and the altitude in the composite image.

Next, a third modification is described. In the operation and the like of the above described image reproduction apparatus, the image of the specific region is invalidated by the image processing for the specific region. However, processing may be performed to emphasize the specific region so that attention is paid to the specific region. For example, the specific region is emphasized by performing image processing of displaying a symbol such as an arrow or a message around the specific region, or image processing such as surrounding the specific region with a frame.

The series of processes described in this specification can be performed by hardware, software, or a combination of hardware and software. In a case where processes are performed by software, a program in which the process sequences are recorded is installed in a memory incorporated into specialized hardware in a computer. Alternatively, the processes can be performed by installing the program into a general-purpose computer that can perform various kinds of processes.

For example, the program can be recorded beforehand in a recording medium, such as a hard disk, a solid state drive (SSID), or a read only memory (ROM). Alternatively, the program can be temporarily or permanently stored (recorded) in a removable recording medium, such as a flexible disk, a compact disc read only memory (CD-ROM), a magnetooptical (MO) disk, a digital versatile disc (DVD), a Blu-ray disc (BD) (a registered trade name), a magnetic disk, or a semiconductor memory card. Such a removable recording medium can be provided as so-called packaged software.

Also, the program may be installed into a computer from a removable recording medium, or may be transferred to a computer from a download site via a network such as a local area network (LAN) or the Internet in a wireless or wired manner. A computer receives the program transferred in such a manner, and installs the program into a recording medium such as an internal hard disk.

It should be noted that the advantageous effects described in this specification are merely examples, and the advantageous effects of the present technology are not limited to them and may include additional effects that are not described herein. Furthermore, it should also be noted that the present technology should not be interpreted to be limited to the above described embodiments of a technology. The embodiments of this technology disclose the present technology through examples, and it should be obvious that those skilled in the art can modify or replace those embodiments with other embodiments without departing from the scope of the technology. That is, the claims should be taken into account in understanding the subject matter of the present technology.

An information processing device of the present technology can also have the following configurations.

(1)

An information processing device including
a specific region information generation unit that generates specific region information indicating a specific region corresponding to a specific imaging region in a composite image obtained by joining captured images acquired by a plurality of imaging units.

(2)

The information processing device according to (1), further including
an imaging information generation unit that generates imaging information indicating an imaging position, an imaging direction, an imaging range, and time information about the imaging units.

(3)

The information processing device according to (2), in which the specific region information generation unit incorporates application range information into the specific region information, the application range information indicating one of an application time of image processing on the specific region and an imaging position to which image processing is applied.

(4)

The information processing device according to (2) or (3), in which the specific region information generation unit sets the specific imaging region that is a region imaged by a specific imaging unit of the plurality of imaging units, an imaging region designated with an orientation and an elevation angle, or an imaging region designated with an apex angle and a corner angle.

(5)

The information processing device according to any of (2) to (4), further including an output unit that outputs the composite image associated with the specific region information.

(6)

The information processing device according to any of (1) to (5), further including:

a composite setting information generation unit that generates composite setting information for joining the captured images acquired by the plurality of imaging units in a continuous manner without image shifting; and a captured image combining unit that generates the composite image in accordance with the composite setting information generated by the composite setting information generation unit.

(7)

The information processing device according to any of (1) to (6), in which the specific region information generation unit generates the specific region information for each restriction level at a time of reproduction of the composite image.

(8)

The information processing device according to any of (1) to (6), in which the specific region information generation unit generates the specific region information by using a region of the composite image as the specific region, the region of the composite image including an imaged predetermined object.

(9)

The information processing device according to any of (1) to (6), in which the specific region information generation unit generates the specific region information in accordance with text data generated from audio data.

(10)

The information processing device according to any of (1) to (6), in which the specific region information generation unit generates the specific region information in accordance with acquired command information.

(11)

The information processing device according to any of (2) to (6), in which the specific region information generation unit generates the specific region information in accordance with position information about an object and the imaging information.

INDUSTRIAL APPLICABILITY

In an information processing device, an imaging apparatus, an image reproduction apparatus, and a method and a program according to this technology, specific region information is generated. The specific region information indicates a specific region corresponding to a specific imaging region in a composite image obtained by joining captured images acquired by a plurality of imaging units. Reproduction control on the composite image is also performed in accordance with the specific region information. Thus, it is possible to easily perform processing on an image of the specific region corresponding to a desired imaging region in the composite image, in accordance with the specific region information. In view of this, the present technology is suitable for generation and reproduction of panorama images, spherical images, and the like.

REFERENCE SIGNS LIST

10 Imaging apparatus
11 Captured image acquisition unit
11-1 to 11-$n$ Imaging unit
12 Imaging information generation unit
13 Composite setting information generation unit
14 Specific region information generation unit
21 Captured image combining unit
22 Encoding processing unit
23 Output unit
24 Storage unit
50, 50$a$ Image reproduction apparatus
51 Image reading unit
52 Decoding processing unit
53 Meta information reading unit
54 Texture generation unit
55 Texture storage unit
56 Composite processing unit
57 Meta information storage unit
58 Output control unit
121 Time code generation unit
122 Clock unit
123 Sensor unit
124 Information generation processing unit

The invention claimed is:

1. An information processing device comprising:
a specific region information generation unit that generates specific region information indicating a specific region corresponding to a specific imaging region in a composite image obtained by joining a plurality of captured images,
wherein each respective captured image of the plurality of captured images is acquired by a respective camera of a plurality of cameras,
wherein the specific region information generation unit generates the specific region information in accordance with text data generated from audio data, and
wherein the specific region information generation unit is implemented via at least one processor.

2. The information processing device according to claim 1, further comprising:
an imaging information generation unit that generates imaging information indicating imaging position information, an imaging direction, an imaging range, and time information about the cameras,
wherein the imaging information generation unit is implemented via at least one processor.

3. The information processing device according to claim 2, wherein the specific region information generation unit incorporates application range information into the specific region information, the application range information indicating one of an application time of image processing on the specific region and an imaging position to which image processing is applied.

4. The information processing device according to claim 2, wherein the specific region information generation unit sets the specific imaging region that is a region imaged by a specific camera of the plurality of cameras, an imaging region designated with an orientation and an elevation angle, or an imaging region designated with an apex angle and a corner angle.

5. The information processing device according to claim 2, further comprising:
an output unit that outputs the composite image associated with the specific region information,
wherein the output unit is implemented via at least one processor.

6. The information processing device according to claim 2, wherein the specific region information generation unit generates the specific region information in accordance with position information about an object and the imaging information.

7. The information processing device according to claim 1, further comprising:
a composite setting information generation unit that generates composite setting information for joining the captured images acquired by the plurality of cameras in a continuous manner without image shifting; and
a captured image combining unit that generates the composite image in accordance with the composite setting information generated by the composite setting information generation unit,
wherein the composite setting information generation unit and the captured image combining unit are each implemented via at least one processor.

8. The information processing device according to claim 1, wherein the specific region information generation unit generates the specific region information for each restriction level at a time of reproduction of the composite image.

9. The information processing device according to claim 1, wherein the specific region information generation unit generates the specific region information by using a region of the composite image as the specific region, the region of the composite image including an imaged predetermined object.

10. The information processing device according to claim 1, wherein the specific region information generation unit generates the specific region information in accordance with acquired command information.

11. The information processing device according to claim 1, further comprising the plurality of cameras,
wherein the plurality of cameras are provided in a physical layout having a predetermined positional relationship between the plurality of cameras.

12. An information processing method for generating information relating to a composite image obtained by joining a plurality of captured images acquired by a plurality of cameras, the information processing method comprising:
generating specific region information with a specific region information generation unit, the specific region information indicating a specific region corresponding to a specific imaging region in the composite image,
wherein each respective captured image of the plurality of captured images is acquired by a respective camera of the plurality of cameras, and
wherein the specific region information is generated in accordance with text data generated from audio data.

13. A non-transitory computer-readable medium having embodied thereon a program, which when executed by a computer causes the computer to execute a method relating to a composite image obtained by joining a plurality of captured images acquired by a plurality of cameras, the method comprising:
generating specific region information indicating a specific region corresponding to a specific imaging region in the composite image,
wherein each respective captured image of the plurality of captured images is acquired by a respective camera of the plurality of cameras, and
wherein the specific region information is generated in accordance with text data generated from audio data.

14. An imaging apparatus comprising:
a plurality of cameras;
a captured image combining unit that generates a composite image by joining a plurality of captured images acquired by the plurality of cameras; and
a specific region information generation unit that generates specific region information indicating a specific region corresponding to a specific imaging region in the composite image,
wherein each respective captured image of the plurality of captured images is acquired by a respective camera of the plurality of cameras,
wherein the specific region information generation unit generates the specific region information in accordance with text data generated from audio data, and
wherein the captured image combining unit and the specification region information generation unit are each implemented via at least one processor.

15. The imaging apparatus according to claim 14, wherein the specific region information generated by the specific region information generation unit is associated with the composite image generated by the captured image combining unit, and is output.

16. The imaging apparatus according to claim 14, wherein the captured image combining unit performs image processing on the specific region in the composite image, in accordance with the specific region information generated by the specific region information generation unit.

17. An image reproduction apparatus comprising:
an image reading unit that reads a composite image generated by joining a plurality of captured images;
an information reading unit that reads specific region information indicating a specific region corresponding to a specific imaging region in the composite image; and
a reproduction control unit that performs reproduction control on the specific region indicated by the specific region information read by the information reading unit in the composite image read by the image reading unit,
wherein each respective captured image of the plurality of captured images is acquired by a respective camera of a plurality of cameras,
wherein the information reading unit reads the specific region information in accordance with text data generated from audio data, and
wherein the image reading unit, the information reading unit, and the reproduction control unit are each implemented via at least one processor.

18. The image reproduction apparatus according to claim 17, wherein the reproduction control unit performs one of an invalidation process and an emphasizing process on the specific region.

19. The image reproduction apparatus according to claim 18, wherein the reproduction control unit combines an image of the specific region with a texture indicated by the specific region information in the invalidation process.

20. The image reproduction apparatus according to claim 18, wherein the reproduction control unit stops outputting an image of the specific region or replaces the image of the specific region with invalid data in the invalidation process.

* * * * *